United States Patent
Sutherland

(10) Patent No.: US 10,251,023 B2
(45) Date of Patent: Apr. 2, 2019

(54) NOTIFICATION AND COMMUNICATION SYSTEM USING GEOFENCING TO IDENTIFY MEMBERS OF A COMMUNITY

(71) Applicant: IN-TELLIGENT PROPERTIES INC., Orland Park, IL (US)

(72) Inventor: Allan C. Sutherland, Orland Park, IL (US)

(73) Assignee: IN-TELLIGENT PROPERTIES INC., Orland Park, IL (US)

(*) Notice: Subject to any disclaimer, the term of this patent is extended or adjusted under 35 U.S.C. 154(b) by 27 days.

(21) Appl. No.: 15/464,848

(22) Filed: Mar. 21, 2017

(65) Prior Publication Data

US 2017/0318419 A1    Nov. 2, 2017

Related U.S. Application Data

(60) Provisional application No. 62/329,925, filed on Apr. 29, 2016.

(51) Int. Cl.
*H04W 4/021* (2018.01)
*G06Q 50/16* (2012.01)
*H04W 4/08* (2009.01)
*H04W 4/90* (2018.01)
*H04W 4/80* (2018.01)

(52) U.S. Cl.
CPC .......... *H04W 4/021* (2013.01); *G06Q 50/163* (2013.01); *H04W 4/08* (2013.01); *H04W 4/80* (2018.02); *H04W 4/90* (2018.02)

(58) Field of Classification Search
CPC ......... H04W 4/021; H04W 4/02; H04W 4/90; H04W 4/22; H04W 4/029; H04W 4/023; H04W 4/04; H04W 76/50; H04W 12/08; H04W 4/008; H04W 4/043; H04W 4/08; H04W 4/80; H04W 4/21; H04L 12/1845; H04L 12/1895; H04L 51/20; G08B 21/22; G08B 21/02; G08B 21/0261; G08B 21/0272; G08B 21/043; G06Q 50/01;
(Continued)

(56) References Cited

U.S. PATENT DOCUMENTS 7,149,533 B2    12/2006    Laird et al.
7,180,415 B2    2/2007     Bankert et al.
(Continued)

FOREIGN PATENT DOCUMENTS

WO    WO2010009324 A2    1/2010
WO    WO2014072510 A2    5/2014
(Continued)

OTHER PUBLICATIONS

Apple Is Launching a Vast Project to Map the Inside of Every Large Building It Can, Edwards, Business Insider, Jun. 7, 2014, pp. 1-3.
(Continued)

*Primary Examiner* — Quoc Thai N Vu
(74) *Attorney, Agent, or Firm* — Gordon Rees Scully Mansukhani LLP; David R. Heckadon

(57) ABSTRACT

A system to communicate with a community of people determined by a geofencing system to be physically present in a geographic region, wherein the system overrides any alert-inhibiting state in the people's smart phones to deliver audio or visual alerts in emergency situations.

21 Claims, 25 Drawing Sheets

(58) Field of Classification Search
CPC .............. G06Q 50/163; G06Q 50/265; H04M 1/72536; H04M 2250/10
See application file for complete search history.

(56) References Cited

U.S. PATENT DOCUMENTS

| | | | |
|---|---|---|---|
| 7,460,020 B2 | 12/2008 | Reyes et al. |
| 7,590,723 B2 | 9/2009 | Mager et al. |
| 8,001,000 B2 | 8/2011 | Butterworth |
| 8,013,734 B2 | 9/2011 | Saigh et al. |
| 8,396,485 B2 | 3/2013 | Grainger et al. |
| 8,624,727 B2 | 1/2014 | Saigh et al. |
| 8,792,906 B2 | 7/2014 | Batada et al. |
| 8,866,673 B2 | 10/2014 | Mendelson |
| 8,971,930 B2 | 3/2015 | Li et al. |
| 9,049,555 B2 | 6/2015 | Wang et al. |
| 9,288,620 B2 | 3/2016 | Menendez |
| 9,351,114 B2 | 5/2016 | Chatterjee et al. |
| 9,363,638 B1 | 6/2016 | Jones |
| 9,549,287 B2 | 1/2017 | Baran et al. |
| 9,589,435 B2 | 3/2017 | Finlow-Bates |
| 9,591,444 B2 | 3/2017 | Qiu |
| 9,712,960 B2 | 7/2017 | Kumar et al. |
| 9,788,153 B1 | 10/2017 | Newstadt et al. |
| 9,788,159 B2 | 10/2017 | Wang et al. |
| 9,826,354 B2 | 11/2017 | Alsina et al. |
| 9,826,358 B2 | 11/2017 | Ryan et al. |
| 9,875,251 B2 | 1/2018 | Jones |
| 9,900,174 B2 | 2/2018 | Gamberini |
| 2006/0121887 A1* | 6/2006 | Chilukoor ............. H04M 3/436 455/412.2 |
| 2011/0112768 A1 | 5/2011 | Doyle |
| 2011/0148634 A1 | 6/2011 | Putz |
| 2012/0084372 A1 | 4/2012 | Cohen |
| 2013/0099977 A1 | 4/2013 | Sheshadri et al. |
| 2013/0203445 A1 | 8/2013 | Grainger et al. |
| 2013/0316740 A1 | 11/2013 | Scarafia et al. |
| 2014/0057648 A1 | 2/2014 | Lyman et al. |
| 2014/0066090 A1 | 3/2014 | Henderson |
| 2014/0220883 A1 | 8/2014 | Emigh et al. |
| 2014/0280526 A1* | 9/2014 | Filho ....................... H04W 4/21 709/204 |
| 2014/0358666 A1 | 12/2014 | Baghaie et al. |
| 2015/0031388 A1 | 1/2015 | Chatterjee et al. |
| 2015/0148061 A1 | 5/2015 | Koukoumidis et al. |
| 2015/0223022 A1 | 8/2015 | Kumar et al. |
| 2015/0237470 A1 | 8/2015 | Mayor et al. |
| 2016/0007156 A1 | 1/2016 | Chiou et al. |
| 2016/0142872 A1 | 5/2016 | Nicholson et al. |
| 2016/0360360 A1 | 12/2016 | Jones |
| 2017/0099579 A1 | 4/2017 | Ryan et al. |
| 2017/0103080 A1 | 4/2017 | Quong |
| 2017/0103410 A1 | 4/2017 | Kerr et al. |
| 2017/0148306 A1* | 5/2017 | Wolfson ............... G08B 25/016 |
| 2017/0289754 A1 | 10/2017 | Anderson et al. |

FOREIGN PATENT DOCUMENTS

| | | |
|---|---|---|
| WO | WO2014089462 A2 | 6/2014 |
| WO | WO2014206627 A1 | 12/2014 |
| WO | WO2015034904 A1 | 3/2015 |

OTHER PUBLICATIONS

Micro-Location for Internet of Things Equipped Smart Buildings, Zafari et al., arXiv:1501.01539 v1, Jan. 7, 2015, pp. 1-16.

* cited by examiner

NOTIFICATION AND COMMUNICATION SYSTEM USING GEOFENCING TO IDENTIFY MEMBERS OF A COMMUNITY

RELATED APPLICATION

The present application claims priority to U.S. Provisional Patent Application, 62/329,925, entitled "A System And Method For Location Based Notification", filed Apr. 29, 2016, the entire disclosure of which is incorporated herein by reference in its entirety for all purposes.

TECHNICAL FIELD

The present invention relates to communication and emergency alert systems that send messages to various communities of smart phone users.

BACKGROUND OF THE INVENTION

People use many different systems to send and receive messages with others, including individual emails, group emails, texts to mobile devices, etc. In addition, people also search the Internet for information. What would instead be desired is a communication platform that quickly and easily identifies people and places them into various communities such that these people can be quickly contacted in the event of an emergency. Ideally, such a system would both give people the option as to what communities they wish to join and also assign them into various communities on the basis of their physical locations (which change from time to time).

For example, building managers and property owners would like to communicate quickly and efficiently with people on their property. This is especially important in times of emergencies such as when police or fire departments are active in the building or on the property. Unfortunately, due to the many different (and private) ways in which people communicate electronically with one another, it can be difficult (if not impossible) to quickly reach all of the people in the building or on the property and quickly notify them in the event of an emergency in the building or on the property. Simply put, when an emergency occurs on a building or property, building management has two basic problems: (1) finding out who is on their property, and (2) communicating quickly with them.

What is instead desired is an integrated system for: (1) quickly locating persons on the building or property, and (2) sending messages informing them of the nature of an emergency. Ideally, such a system would seamlessly work in the background on people's smartphones such that people entering the building or property would not be not required to first "check-in" with building management. Rather, an ideal system would seamlessly automatically check these people in as they physically entered the property. Such a system would thus know who exactly is in the building or on the property at the time of the emergency.

In addition, emergency alert messages would preferably be delivered to the people in the building or property community in a manner that overrides any smart devices that are set to "silent" or "do not disturb" and have their sound or screen notifications turned off. Instead, it would be preferable to interrupt such alert-inhibiting "do not disturb" settings in the case of actual emergencies. Optionally, such a system could also send messages to people who are not physically present on the property at the time, but who have previously "identified" themselves as being connected to the property (for example, commuters returning to the building on their way home from work would wish to be notified of any building emergencies). Optionally, such a novel communication system could also send non-emergency information to people determined to be on the property (for example, the system could send messages about building elevators, parking, or even advertisements from businesses on the property). Optionally as well, such a system could also provide non-building-specific information to building occupants (for example, it could send messages or information about traffic, news and weather). As will be explained herein, the present system can meet these above desires.

SUMMARY OF THE INVENTION

The present system provides a system for to communicate with a community of people determined by a geofencing system to be physically in or near a location such as a building or property, wherein the system overrides any alert-inhibiting state in the people's smart phones to deliver audio or visual alerts in emergency situations. In optional preferred aspects, the present system is used by building managers to communicate with people living or working in a building, or by university administration to communicate with students or instructors on a university campus, or by airport management to communicate with travelers passing through the airport, or to communicate with fans at a sporting game. As can be appreciated, the present communication and emergency alert system can be used by many different groups of administrators to communicate with many different communities of people. Moreover, certain individuals may be members of more than one community at the same time, and the communities themselves may change over time based both on the user's preferences and on their physical locations.

In one preferred example, the present invention preferably provides a system to communicate with members of a community, comprising: (a) a geofencing system operating on a building or property (or any geographic area or region) for: (i) determining the location of a plurality of individuals based upon the location of their smart devices, and (ii) adding the individuals that are determined to be physically present in a building or on a property to a property community; (b) a subscription system operating on the smart devices for adding individuals that are not determined to be physically present on the property to the property community; (c) a safety alert system operating on the smart devices for transmitting safety alerts from property management to the members of the property community, by: (i) communicating with the smart devices to determine their alert-receiving state, and then either: (1) requesting to override any alert inhibiting state, and then overriding the alert inhibiting state with the user's permission to ensure that the smart device is alert-enabled, or (2) automatically overriding any alert inhibiting state to ensure that the smart device is alert-enabled, and (ii) transmitting the safety alert to the smart device; and (d) a property-specific communication system operating on the smart devices for sending property-specific messages from the property management to the members of the property community. Optionally, a system also exists for transmitting non-property-specific messages to the users as well. It is to be understood that "property management" as described herein may refer to traditional building managers, but may also refer to university campus administration, the persons directing the operation of an airport, transportation facility, shopping center, mall, department store, etc.

Preferably, the present geofencing system comprises Bluetooth low energy proximity sensing devices (such as an I-Beacon) that sends signals a short distance to determine which smart devices are physically present on the property.

Preferably as well, the present system is operated through a downloadable phone app on the users' smartphones or smart devices (e.g.: laptops, iPads, or other computer devices). Emergency messages and alerts can be broadcast to the users' smart phones and may be audible or visual alarms, or both.

Examples of property-specific messages may include traffic messages, parking messages, property security messages, property elevator messages, building status messages and even advertisements from businesses in the building, nearby, or otherwise associated with the property. Examples of non-property-specific messages can include news, weather or traffic messages.

In optional embodiments, the present system also lets users subscribe to join building or property communities without having to be physically present in the building or on the property. This has the advantage of informing these other interested parties (such as apartment building occupants who are away at work) about building or property or campus events. Moreover, this system could also be used for people to subscribe to multiple communities at the same time (such as building contractors who work on different properties for building management and need to be informed of building status for several building properties at once). For example, in the case of a university or college, a first community may be set up for "all people on campus", and additional communities may be set up for "Professors" and for "Students". Communities may be broken down further, for example by setting up a community for "Freshmen", etc. Individuals may be members of different communities at different times, and such communities may have overlapping memberships. In the event of an emergency on campus, a message or notification could be sent to the community "all people on campus", whereas invitations for events on campus would likely be tailored to more specific sub communities.

The present invention also preferably provides a method of communicating with members of a community, comprising: (a) using a geofencing system to determine which individuals are physically present in a geographic area or region such as a building or on a property based upon the location of their smart devices; (b) adding the individuals that have been determined to be physically present in the geographic area or region by the geofencing system to a property community; (c) permitting individuals that are not physically present on the property to subscribe to join the property community; (d) determining the alert-receiving state of each of the individuals' smart devices, and then overriding any alert-inhibiting state of the smart devices to ensure that the smart devices are alert-enabled, and then (e) transmitting a safety alert to each of the smart devices; and (f) transmitting property-specific messages to the smart devices.

A first advantage of the present system is that it automatically determines who is present in the geographic area or region (i.e.: in a building, or on a property including, but not limited to, a yard, campus, airport or shopping center). As such, a person entering the property does not need to "check in" with the system, or with building management. Rather, persons entering the property can be auto-subscribed and thereby join the property community when they first walk onto the property and approach one of the building or property's proximity sensors.

A second advantage of the present system is that it can override an alert-inhibiting "silent" or "do not disturb" setting on the users' smart devices and thereby deliver emergency alerts and notifications that can be quickly seen and/or heard by all of the people on the property in an emergency situation.

DETAILED DESCRIPTION OF THE DRAWINGS

The present system provides a method of communicating with members of a community by using geofencing to determine the location of uses such that they can optionally be automatically added to a community. As such, members of may be auto-subscribed into the community based on their physical locations (which may change from time to time). As will be shown, members or users can also be added to the community based on their own user preferences. People can be members of more than one community and the communities can change over time.

Figure 1:
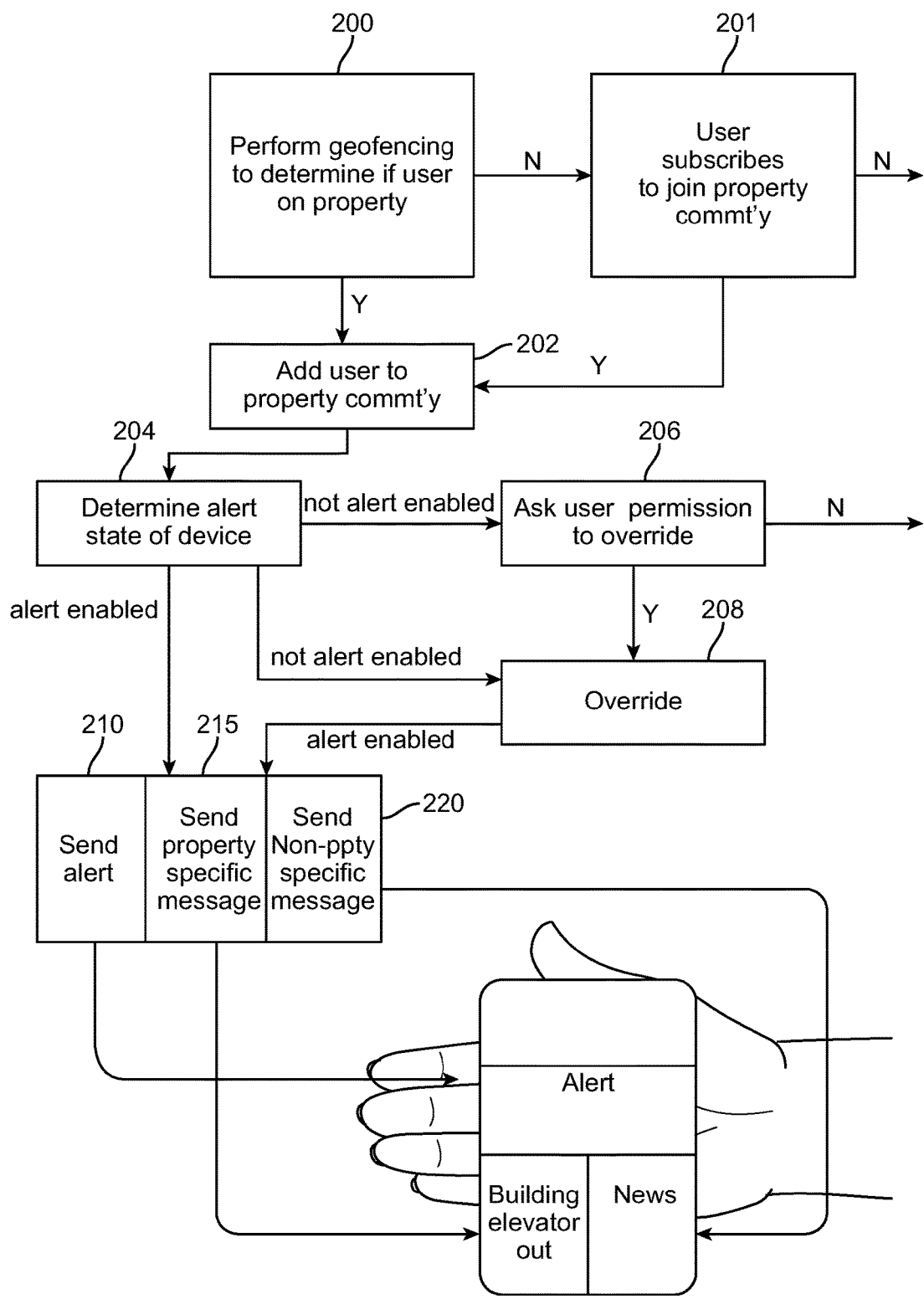
FIG. 1 is a simplified flowchart of an exemplary embodiment of overall system operation for the present system.

For example, FIG. 1 is a simplified flowchart of overall system operation in one particular embodiment of carrying out the present invention, as follows. First, at step 200, the geofencing systems (50 and 150 in FIG. 3) together determine whether a particular user's smartphone is physically present in a geographic region or area or range (for example, in a building or on a property) based upon the physical location of the smartphone. If the user's phone is determined to be on the property, the user's phone can be automatically added to the property community at step 202. In cases where the user's smartphone is determined not to be physically present on the property (i.e.: not detected by proximity sensors 20 in FIG. 3), the user can be provided with the option of voluntarily subscribing to join the community at step 201 (this would be done through the app on the user's smartphone). In this way, interested users (e.g.: building tenants who are away at work, or persons working at different jobsites) can be kept informed of developments and alerts with regard to a particular property community even when they are physically away from that property.

Next, the present system determines the "alert state" of each of the individuals' smart devices at step 204. This is accomplished by system 12 sending a signal to the smartphone to determine if the smartphone "silent" or "do not disturb" setting is on. If the smartphone setting is alert-enabled (i.e.: the "do not disturb" or "silent" function is not turned on), then the smartphone is ready to receive alert messages at step 210. However, in those cases where the smartphone is not alert-enabled (i.e.: the "do not disturb" or "silent" function is turned on), then one of two options is possible. First, at step 206, the user can be sent a message asking if the alert setting can be switched to alert-enabled. Should the user agree and grant permission, then the alert enabled setting is enabled (i.e. the "do not disturb" or "silent" function is overridden) at step 208. Alternatively, the present system may instead proceed directly from step 204 to step 208 where the present system automatically overrides the "do not disturb" or "silent" function, thereby enabling the smartphone to receive alerts and communications from system 12.

As such, an important advantage of the present system is that it can "break through" normal email and text traffic (even when the user's phone is set on silent) and warn building or property occupants in the event of an emergency situation (such as a fire, crime or medical emergency).

In addition to sending safety alerts at step 210, the present system also can send property-specific (or interest group-specific) messages at step 215 and non-property-specific messages (i.e.: messages appealing to more than one property or interest group-specific group) at step 220. In different optional embodiments of the present system, the property-specific messages sent at 215 and the non-property-specific messages sent at 220 may be sent with the smartphone's "do not disturb" or "silent" function overridden and turned off. However, the more likely desired setting may be to have the property-specific messages at 215 and non-property-specific messages at step 220 be subject to the smartphone's "do not disturb" or "silent" settings. In such a case, the present system can be configured such that only safety alert messages will override the smartphone's "do not disturb" or "silent" settings while other messages (e.g.: building advertisements/messages) will not override the smartphone's "do not disturb" or "silent" settings. The settings used can optionally be set either by members of the community themselves, or by the manager or administrator of the community, or both. This is desirable such that users/community members receive safety alerts such as "fire" or "active shooter in the building" without such messages being silenced, but are able to block, silence or turn off messages like "lunch specials in the building's cafe". In preferred aspects, such advertising may be very targeted and, for example, by being tailored to businesses within a 2 to 3 block radius around building. Moreover, when the user/community member first signs up and registers with the present system, they can be asked a series of questions to better target the advertising (to their desires in addition to their location).

Figure 2:
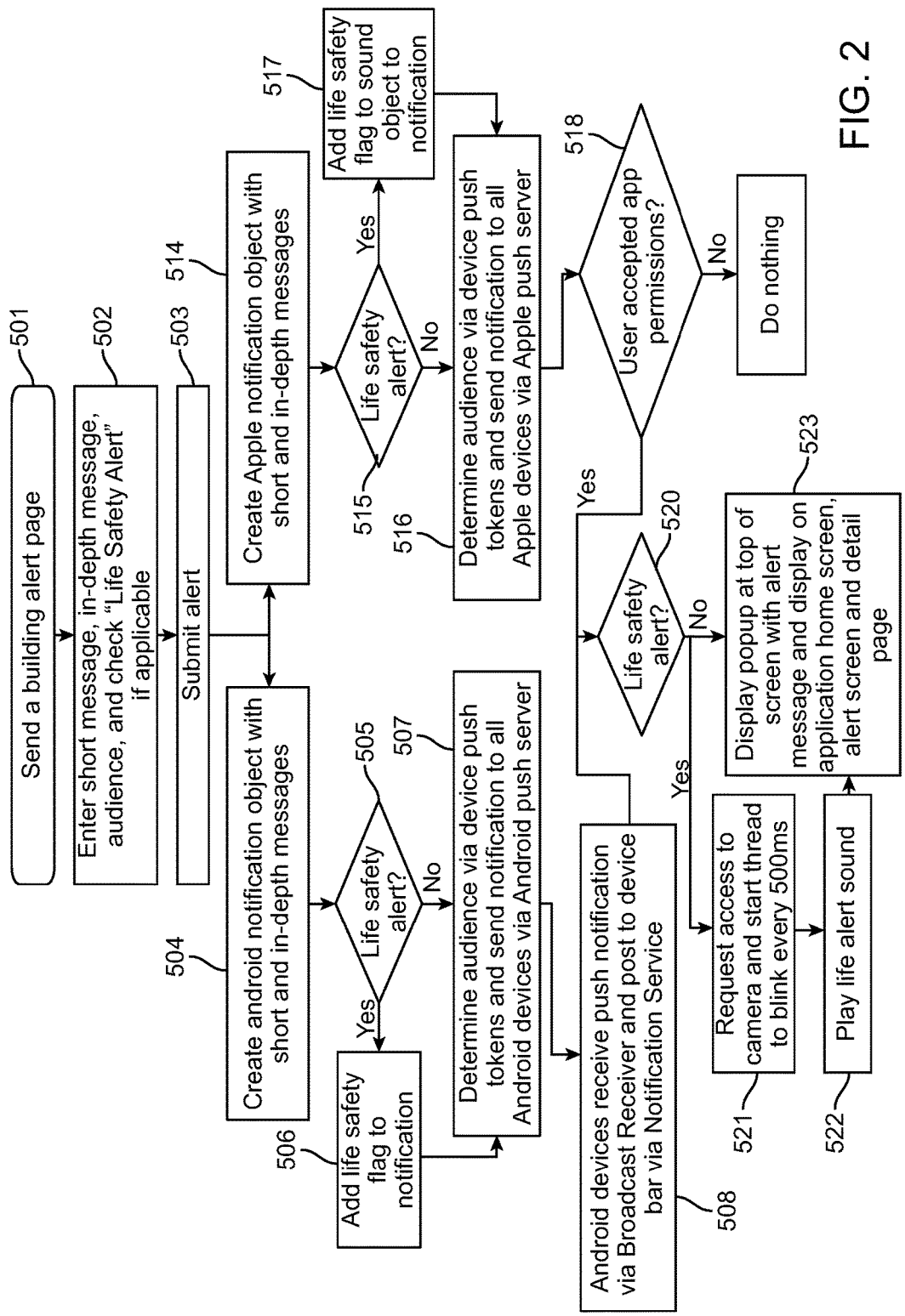
FIG. 2 is a flowchart showing an exemplary process for sending alerts to a property community.
Figure 3:
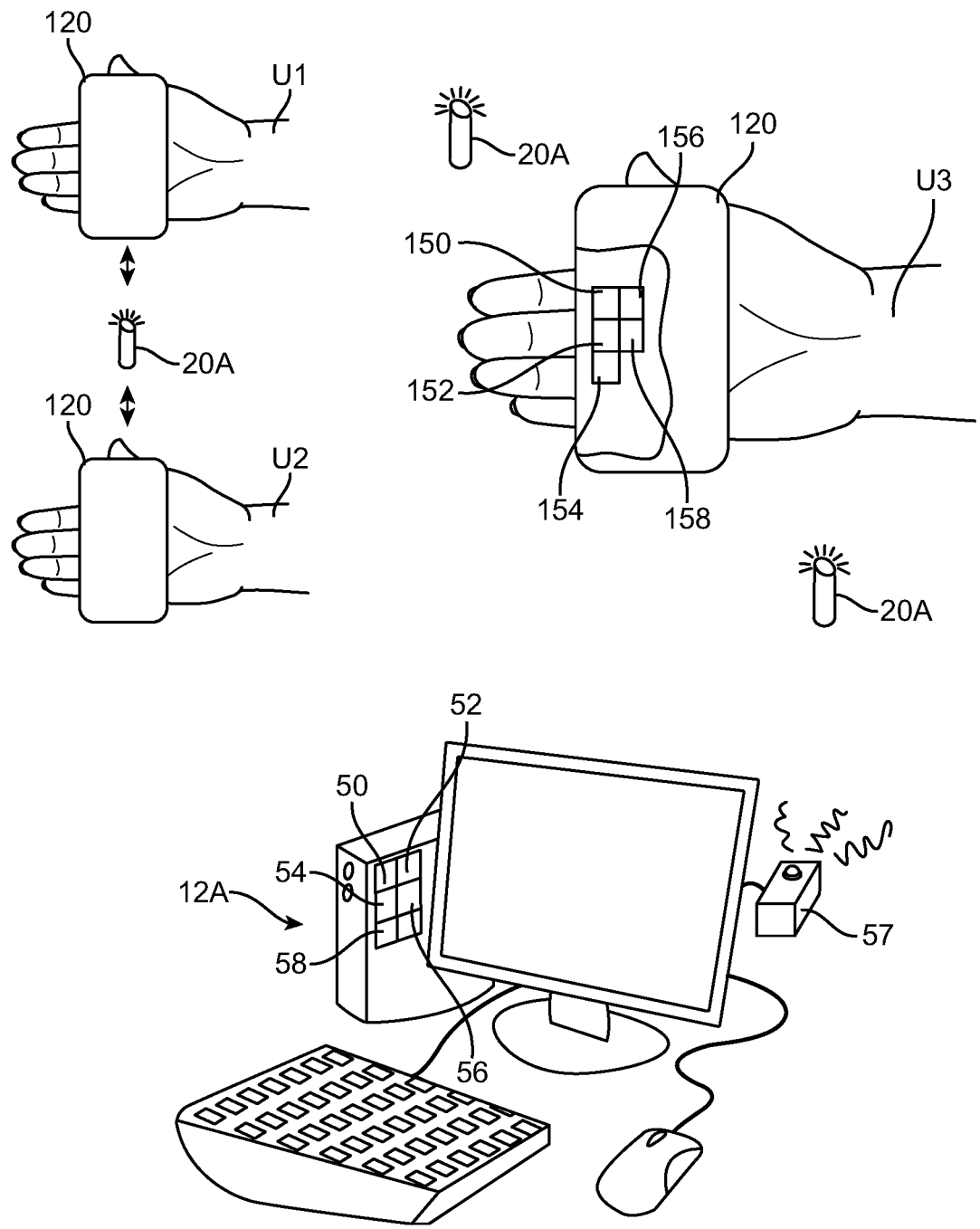
FIG. 3 is an illustration of various members of the community interacting over a network on smartphones and computer terminals.
Figure 5:
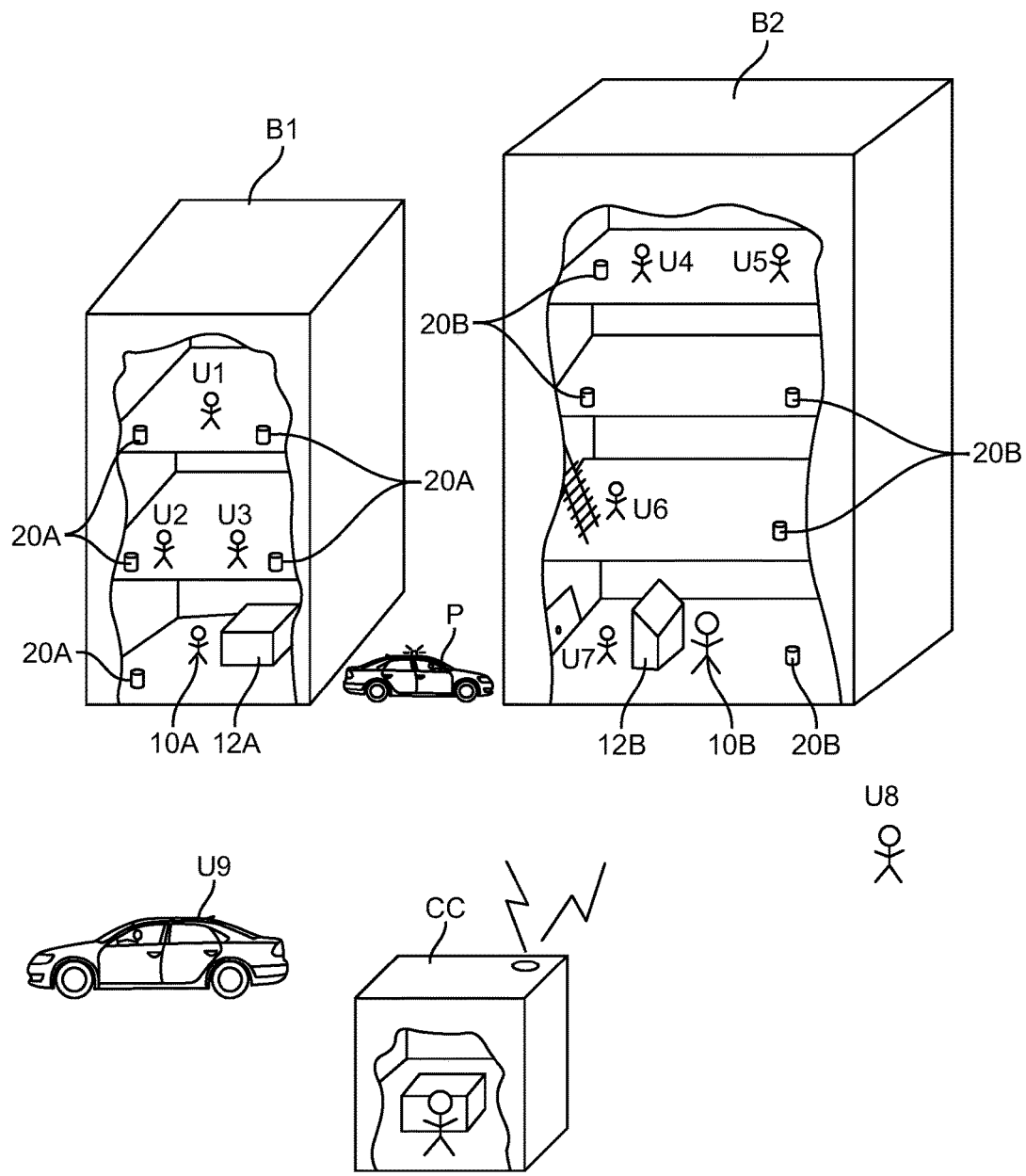
FIG. 5 is a schematic illustration of the interworking of the various components of the present system in operation in a neighborhood of buildings.

FIG. 2 is a flowchart showing an exemplary process for sending building alerts to a property community. At step 501, the building manager opens a building alert page on their computer system 12A or 12B (FIGS. 3 and 5). Next, at step 502, the building manager enters the alert (e.g.: "elevator #4 is not working"). The alert is then submitted to the system at 503. Next, the system creates an Android notification at 504 and an Apple notification at 514. (It is to be understood that the present invention is not limited to Android and Apple devices, but these can instead be operated on any desired operating system. (The operating systems Android and Apple as discussed herein are therefore merely exemplary). The present system then determines if the alert is a life safety alert at steps 505 and 515. If it is a life safety alert, then a flag can then be added at step 506 or 517. For Android devices, a push notification can be sent at 507 which is sent to the notification service at 508. Similarly, for Apple devices, a push notification can be sent at 516. The Apple user then accepts the permission change (i.e.: lets the present system override any "silent" or "do not disturb" settings in the case of an emergency alert) at 518. Assuming that a life safety alert has been sent at 520 then a visual alert will start at step 521 and an audible sound or alarm can be played at step 522. Alternatively, of the alert is not a life safety alert, then the message can simply be displayed on the user's screen at step 523.

FIG. 3 is an illustration of various components of the present system working together on different users' smartphones 120, as follows. The smartphones of users U1, U2 and U3 are all present near various proximity sensors 20A on the property. Proximity sensors 20A detect the presence of these smartphones by emitting a short range Bluetooth signal that is picked up by the downloaded software app on each of the phones that preferably runs the present system. Thus, when each of the smartphones communicates using the app, communication system 12A will know that these smartphones are part of the property community, and send the alerts and notifications to these smartphones. One advantage of using such short distance proximity detectors 20A is that they have a much reduced battery drain as compared to using the smartphone's GPS system.

The administrator or manager of the community (e.g.: building management personnel) can use their communication system 12A to communicate with users/community members U1, U2 and U3. Communication system 12A may comprise a geofencing system 50, a subscription system 52, a safety alert system 54, a property-specific communication system 56 and a non-property-specific communication system 58. Also included is a transmitter 57 for communicating over a network or wi-fi connection to the smartphones of users U1, U2 and U3. Preferably, each of these illustrated computer sub-systems (12A and 120) comprise dedicated hardware and software. It is to be understood, however, that the present system can use software or hardware or a combination of both and that the computer program(s) running the system can be resident in the smartphones of the users/community members and building managers, or be resident in a dedicated server, or be resident in the Cloud, or some combination of these.

Geofencing system 50 determines which smartphones are in the proximity of sensors 20. Subscription system 52 operates to add users to the property community. Safety alert system 54 manages the sending of property safety alerts to the property community. Property-specific communication system 56 manages the sending of property-specific news and alerts to the property community. Non-property-specific communication system 58 manages the sending of non-property-specific news and alerts to the property community. As can also be seen, a control center CC preferably communicates with a plurality of different communication systems (12A and 12B, etc.) at the same time.

As seen in FIG. 3, each of the users U has their own smartphone 120. Smartphone 120 runs a downloaded app that performs the functions of the present system. Specifically, smartphone 120 comprises a downloaded software app that includes a geofencing system 150, a subscription system 152, a safety alert system 154, a property-specific communication system 156 and a non-property-specific communication system 158. Geofencing system 150 communicates with geofencing system 50 in communication system 12. Similarly, subscription system 152 communicates with subscription system 52 in communication system 12. Similarly, safety alert system 154 communicates with safety alert system 54 in communication system 12. Similarly, property-specific communication system 156 communicates with property-specific communication system 56 in communication system 12. Lastly, non-property-specific communication system 158 communicates with non-property-specific communication system 58 in communication system 12. Preferably, the safety alert system 154 and the property-specific communication system 156 both operate through the same single downloadable app on each of the smart devices.

In optional embodiments, the safety alert systems (54 and 154) and the property specific communication system (56 and 156) operate over wi-fi on the property. In other optional embodiments, the safety alert system and the property specific communication system operate over in-building cellular antennae. It is to be understood that the present system is not limited to any particular form or system of communication between the system administrator and the community members.

Figure 4:
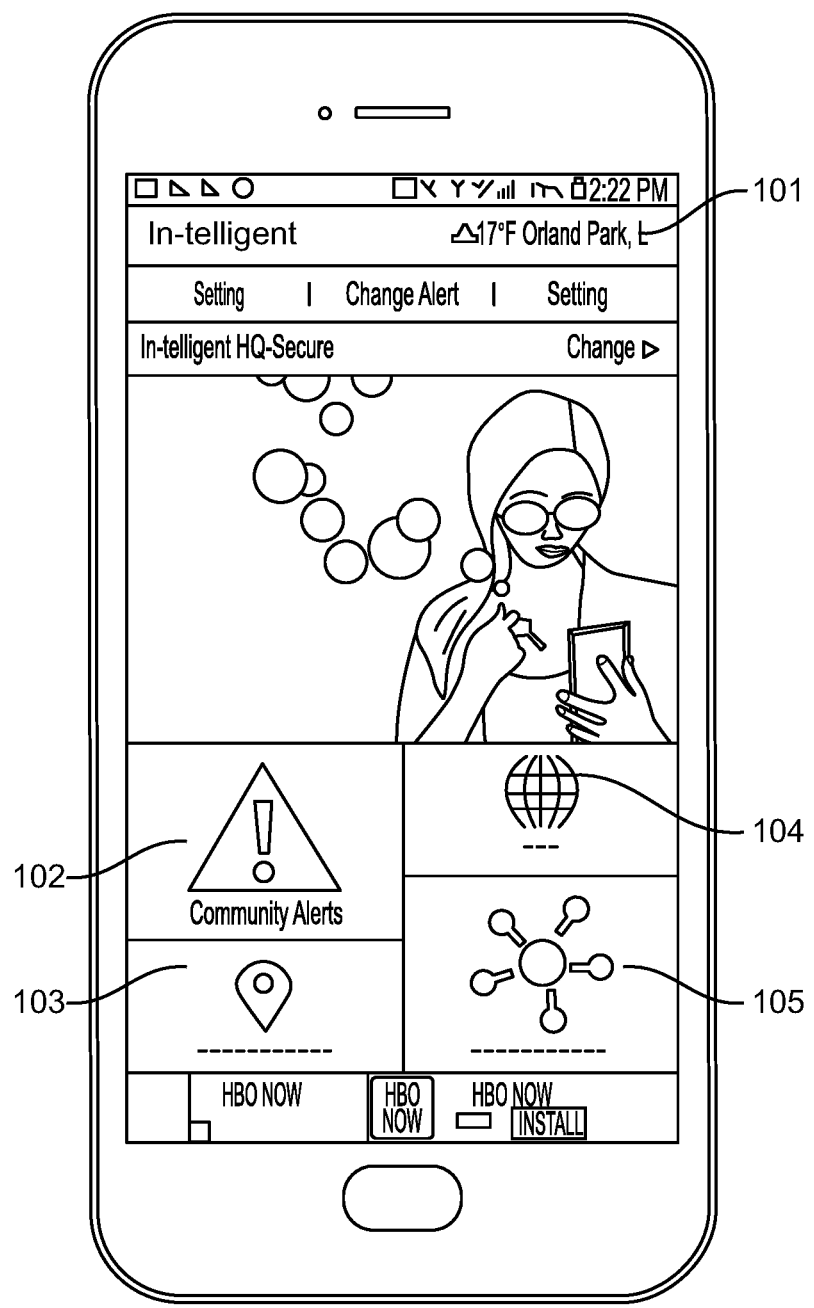
FIG. 4 is an illustration of a phone screen running a downloaded software app that operates the present system.

FIG. 4 is an illustration of an exemplary phone screen running a downloaded software app that operates the present system. As can be seen, the user's community can be displayed at 101, alerts displayed at 102, directions displayed at 103, news displayed at 104 and Internet searches performed by tapping on region 105 of the display screen. It is to be understood that this is only one exemplary screen layout and that the present system can be configured for any display arrangement, all keeping within the scope of the present system.

In various aspects, the present system can ideally be used by property management to send messages to a community of people who have been determined by a geofencing system to be physically present on the property. An example of such a system is illustrated in FIG. 5 which shows the interworking of the various people and electronic components of the present system in operation in a neighborhood. In this particular example, two buildings B1 and B2 are across the street from one another. Each building has its own building manager 10A or 10B who operates their own communication and notification system 12A or 12B. It is to be understood that any number of buildings or properties can be encompassed within the present system. It is also to be understood that any type of property may use the present system, and that it is in no way limited to apartment block buildings, as illustrated in FIG. 5. Moreover, the entire system (and communication and notifications within the community) can optionally be controlled at one or more remote control centers CC in communication with the building managers 10. The remote control center CC preferably houses the necessary computers, servers, and administrators to run the system. Moreover, these control centers CC need not be brick and mortar locations, but may also encompass computer systems running in the Cloud.

Each building B1/B2 has a plurality of proximity sensing devices 20A or 20B on their property. (See proximity sensors 20A on each of the floors of building B1 and proximity sensors 20B on each of the floors of building B2). Proximity sensing devices 20A or 20B emit a location signal that is picked up by the users U's smartphones when they are in the vicinity of the one of the proximity sensing devices 20A or 20B. Preferably, proximity sensing devices 20A or 20B only operate over short distances, and may optionally use Bluetooth low energy devices including I-Beacons. In the illustrated FIG. 5, users/community members U1, U2, and U3 are in building B1 and their locations will be detected by one of proximity sensing devices 20A. As a result, communication system 12A will add users U1, U2 and U3 to a "property community" for this building B1. Across the street, the smart phones of users U4, U5 and U6 will be detected by proximity sensors 20B and users U4, U5 and U6 can automatically be added to a similar "property community" for building B2. In accordance with the present system, building manager 10A will use communication system 12A to send alerts and messages to the smartphones of users U1, U2 and U3. Similarly, building manager 10B will use communication system 12B to send alerts and messages to the smartphones of users U3, U4 and U5.

In optional embodiments, proximity sensors 20 may be sophisticated enough such that can determine the user's location within the building. This would involve each of the sensors transmitting a different signal or signature to the users' smartphones.

User U7 is a person about to walk across the street from building B2 to building B1. When user U7 is still in building B2, (s)he will be within the "property community" of building B2, and will therefore receive communications from communication and notification system 12B. After (s)he walks across the street and enters building B1, one of proximity sensors 20A will then detect his/her presence and automatically add him/her to the property community for building B1. Also, after user U7 has left building B2, (s)he will be out of range of proximity sensors 20B, and be automatically removed from the property community of building B2. User U8 is presently out of range of both buildings B1 and B2 and will therefore not be part of either property community.

The present system preferably also includes a subscription system enabling users to join a property community even if they are not physically present on the property. For example, user U6 may be a building facility person who works in both buildings B1 and B2. User U6 may therefore wish to be members of both the property communities for buildings B1 and B2 at all times. In accordance with the present system, user U6 simply subscribes (through the downloaded software app on his/her smartphone) to join both building communities. For example, user U9 lives in building B1 but is presently commuting to work. User U9 simply subscribes to join the property community for building B1 such that (s)he will receive all the messages from system 12A for building B1 throughout the day.

In accordance with the present system, building communities may be joined together if desired. For example, should a police cruiser P be investigating a dangerous situation in building B2, it may be prudent to also warn the occupants of building B1. Therefore, building manager 10B can instruct his/her system 12B to alert system 12A such that alerts and messages can be simultaneously sent to all of the occupants of buildings B1 and B2. Alternatively, this coordination between systems 12A and 12B can be handled by (or with the assistance of) control center CC.

In further optional aspects, building communities that are within preferred distances of one another can be joined and messages sent simultaneously to the communities over their own dedicated property community networks. For example, it may be a desirable option for a building community to "link to other property communities within 1 mile" or "link to other property communities within 2 miles", or link to other property communities on adjoining properties", etc. This feature of the present system is particularly advantageous in police, fire or natural disaster scenarios. The coordination of such linking may be handed by the various building managers 10 or by the administrators or computer systems in the control center CC, the police and/or fire departments, of some combination of these.

Figure 6:
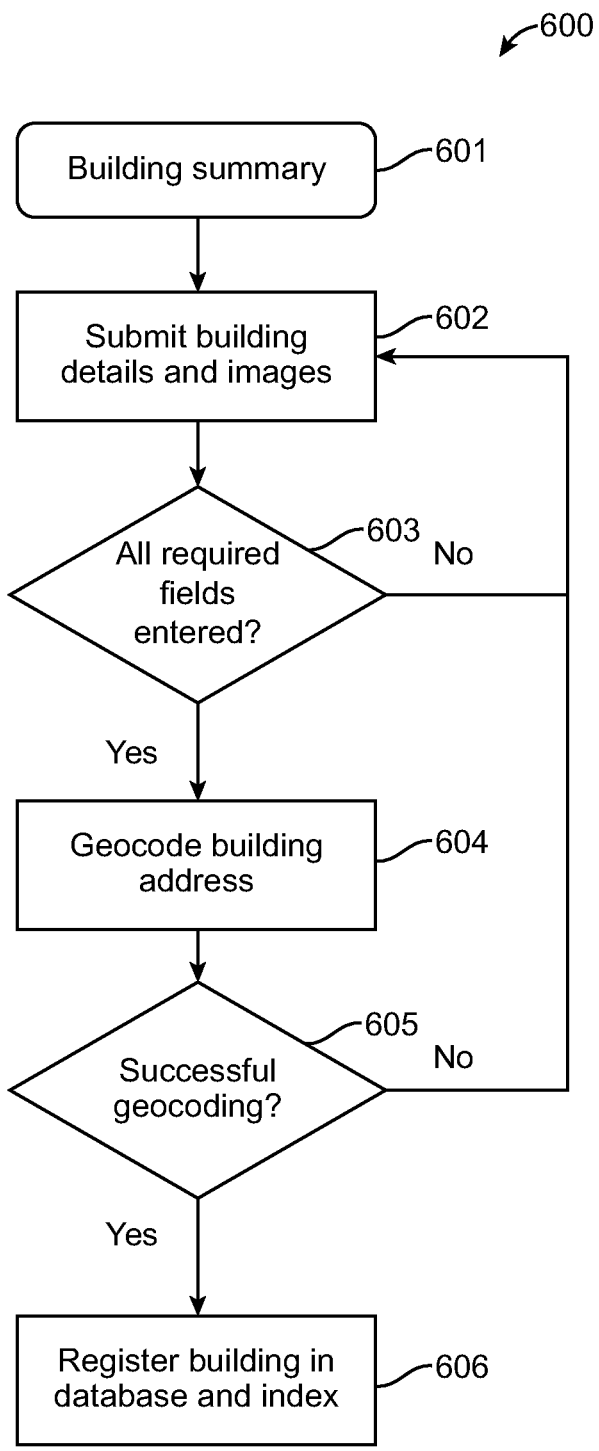
FIG. 6 is a flowchart of an exemplary process for initially registering a building with the present communication and notification system.

FIG. 6 is a flowchart showing a preferred process 600 of registering a building (or other property) with the present communication and notification system 12. This process occurs, for example, when new buildings are first added to one of the communities of networks covered by the present system (for example, when building B2 in FIG. 1 is first added to the present network). This process is optionally managed by control center CC in FIG. 5. First, the building management 12B will add a summary of the building at 601, and submit building details and images at 602. A check can be performed to make sure that all fields are entered at 603. The building's physical address can be geocoded at step 604 with a check performed at 605. Assuming all relevant data is entered and correct, then the building registration with the system is completed at 605 when the building is added to an index managed by the control center CC.

Figure 7:
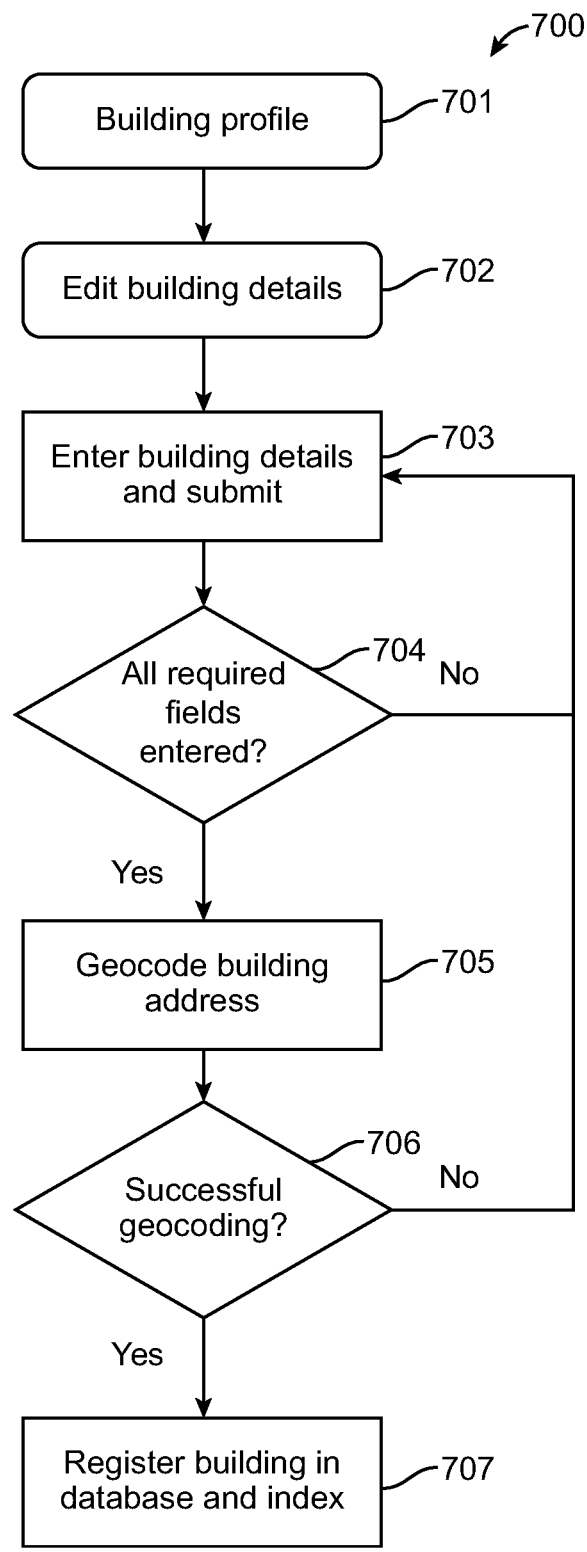
FIG. 7 is a flowchart of an exemplary process for editing the building details after the building has been registered with the present communication and notification system.

FIG. 7 shows an exemplary process 700 of editing the building details after the building has been registered with the present communication and notification system (as would typically be performed by building management 12B). First, the building profile is entered at step 701, building details are edited at step 702 and then entered and submitted at 703. A check is performed at 704, the building address geocoded at 705 and another quality check is done at 706 and the building edits are registered at 707. Again, this process may be managed by control center CC.

Figure 8:
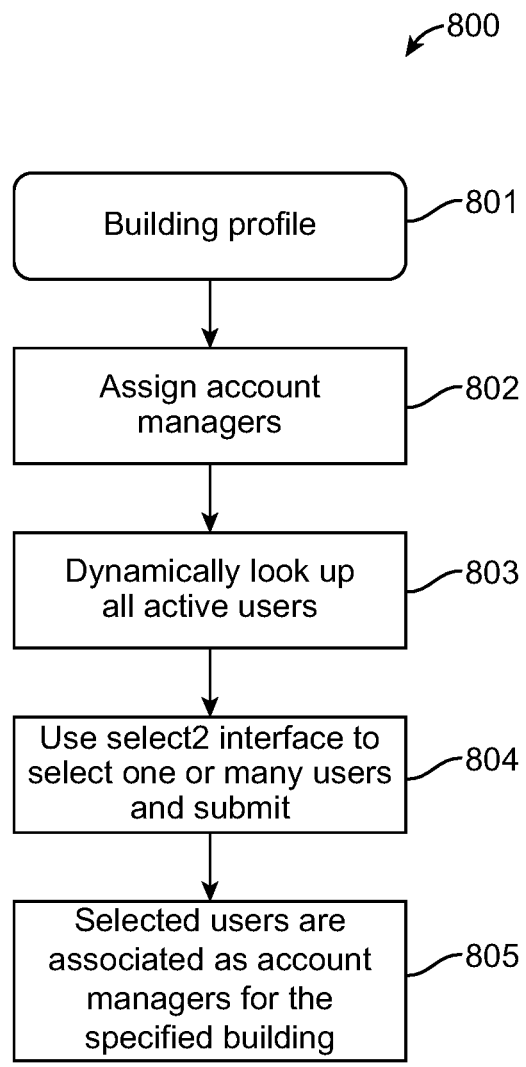
FIG. 8 is a flowchart of an exemplary process for assigning building account managers to each of the buildings registered with the present communication and notification system.

FIG. 8 illustrates an optional process 800 of the control center CC assigning building account managers 12 (from the building community) to the present communication and notification system such that these building managers can then run building alerts (for the other members of the building community). For each building profile 801, the building account managers are added (e.g.: by the control center CC) at step 802. Next, at step 803 the building account managers can look up all the other members of the building community. Next, at step 804, the building account managers can select those members of the building community that they want to communicate with. Finally, at step 805, the building account managers associate the selected other users/community members with the account.

Figure 9:
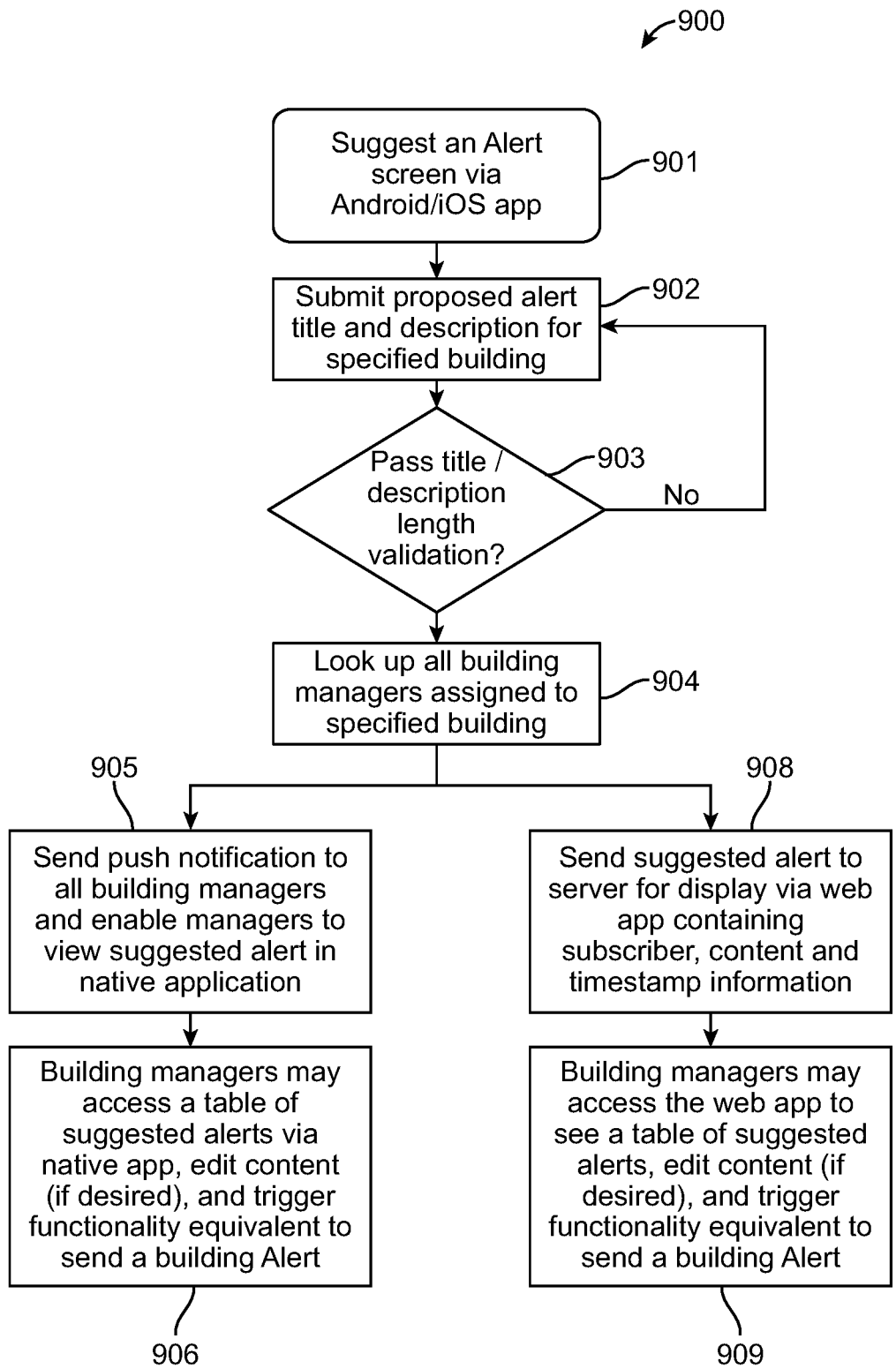
FIG. 9 is a flowchart of an exemplary process for a system administrator to send building alerts to various building managers.

FIG. 9 illustrates an optional process 900 of sending alerts from control center CC to building management 12 such that the building managers 12 can then send these alerts onward to people determined to be on their property (and to those people who subscribe to their property community). First, at step 901, an alert screen opens in the control center CC and at 902 a proposed alert is generated. At 903, a check is done on the alert's description. Next, at step 904, the building managers 12 that are associated with the particular property are located. Next, push notifications can be sent to the building managers at 905 to view the alert, and at 906, the building managers can edit and send out the building alert to the greater property community. Alternatively, the alert can be via a web app to the building managers and at 909, and the building manager 12 can send out the alert via a web app to the property community.

Figure 10:
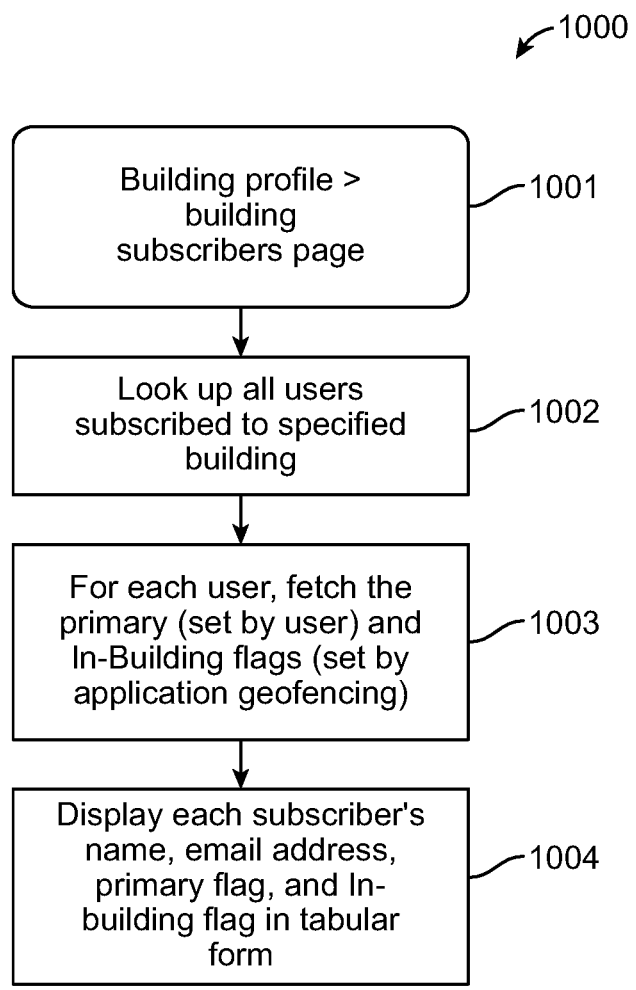
FIG. 10 is a flowchart of an exemplary process for building managers to view building subscribers.

FIG. 10 is a flowchart of an exemplary process 1000 for building managers to view building subscribers/community members. First, at 1001, the building manager logs into their computer screen. Next, at 1002, the building manager looks up all the subscribers to their specified building community. At 1003, the building manager requests the building community members' preferences and asks whether they are on the property or in the building (as determined by geofencing) with the results displayed at 1004.

Figure 11:
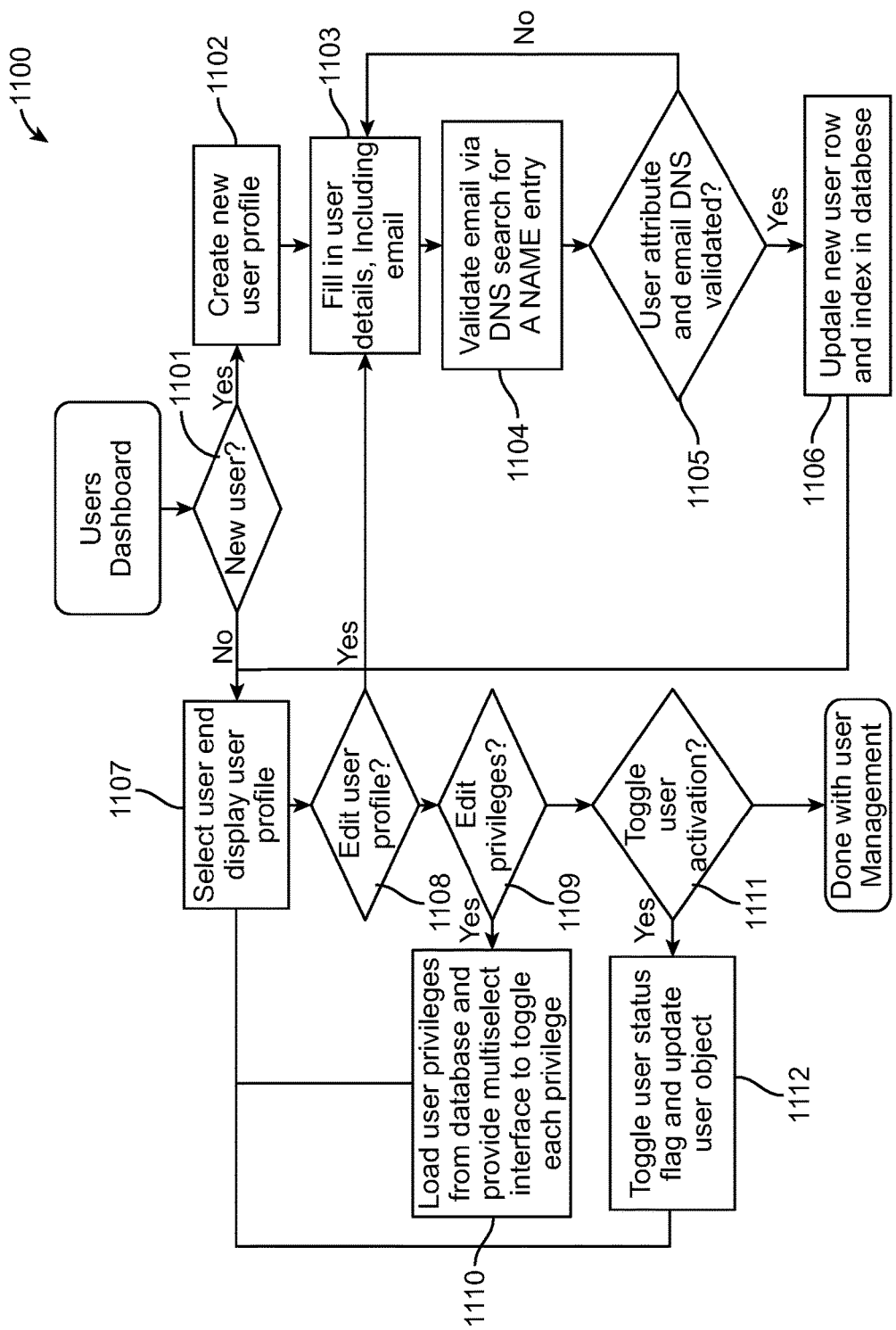
FIG. 11 is a flowchart of an exemplary system for a system administrator (such as a building manager) to manage the various users in their own building community.

FIG. 11 illustrates an optional process 1100 of user management by building manager 12 and/or control center CC administrator managing the various users in their particular building community, as follows. First, when a new user 1101 registers with the system, their profile can be created at 1102, with their email address added at step 1103 and validated at step 1104. At step 1105, the user's domain name is validated. Next, at step 1106, the new user 1101 is added to the property community. In addition, the profile of users already in the community can be displayed at step 1107 and edited at 1108. The user/community member's privileges can be edited by building management at step 1109 and the user can then toggle between privileges at 1110. The user can also toggle to activate their app at 1111 and status flag at 1112.

Figure 12:
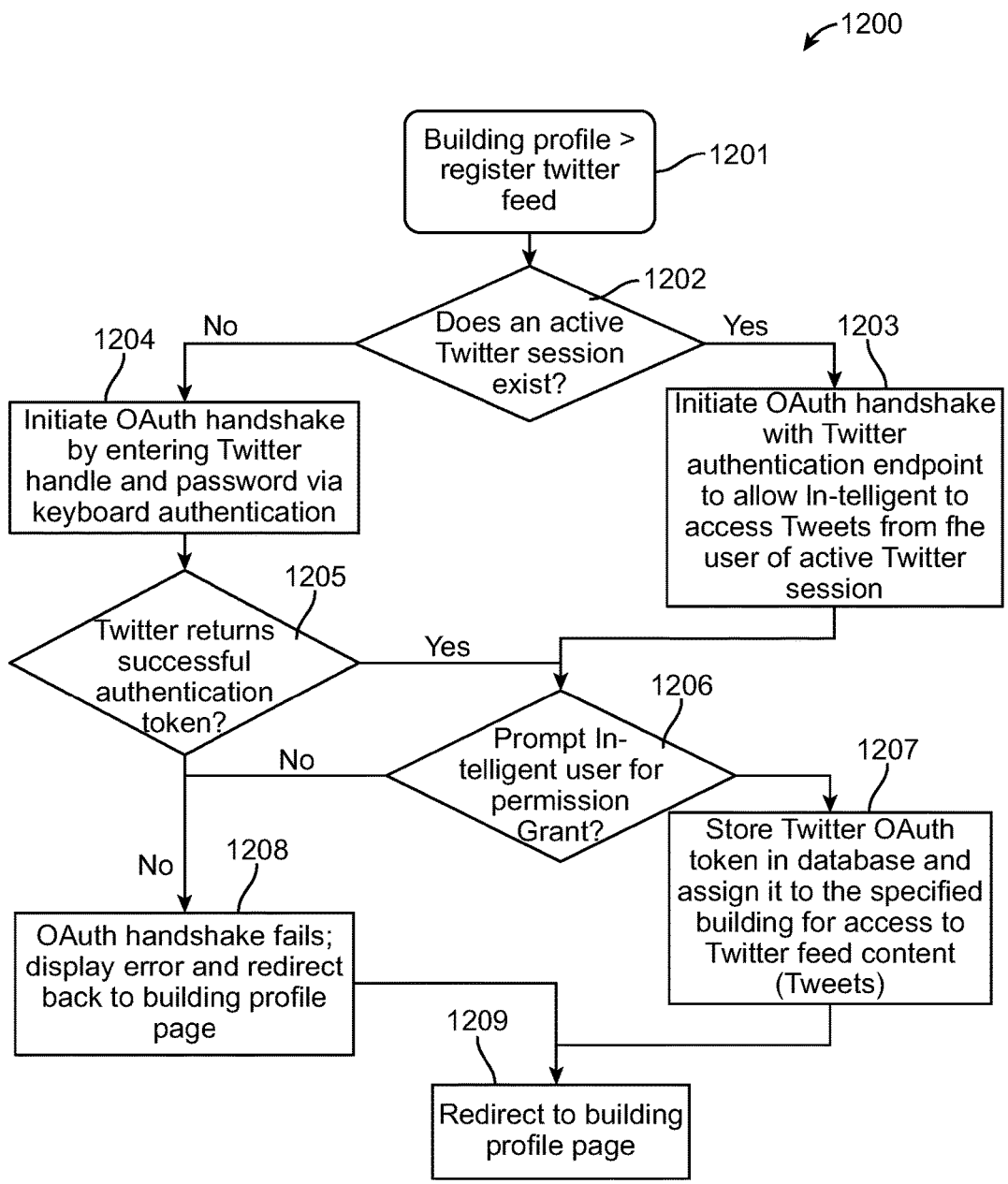
FIG. 12 is a flowchart of an exemplary system for a system administrator (such as a building manager) to add a Twitter feed to the communication and notification capabilities of the present system.

FIG. 12 is a flowchart of an exemplary process 1200 for a system administrator to add a Twitter feed to the present system, as follows. First, at 1201, the system administrator logs into the system. At 1202, the system determines whether an active Twitter session already exists. If a session already exists, a handshake is authorized at 1203. If a session does not already exist, a handshake is sent at 1204 and the new user/community member enters their Twitter account information. At 1205, Twitter authenticates the new user's account. Next, at 1206, the user is prompted to grant Twitter access. At 1207, an authentication token can be stored (to permit access of future Twitter messages). Alternatively, should the handshake of 1206 fail at 1208, the user can be redirected to a Building Profile page at 1209.

Figure 13:
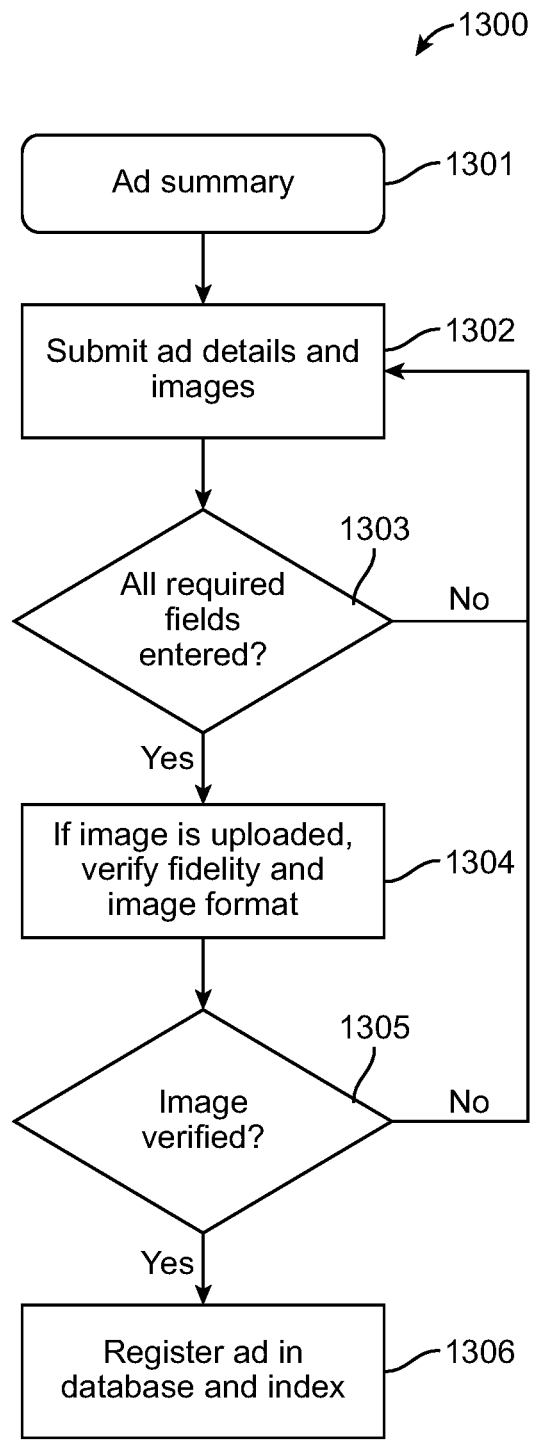
FIG. 13 is a flowchart of an exemplary system for a system administrator to register advertisements for use with the present communication and notification system.

FIG. 13 illustrates an optional process 1300 for a system administrator to register an advertisement for use with the present system. At step 1301, a summary of the advertisement is provided. Next, at step 1302, further details and images of the advertisement are submitted, fields are checked at step 1303, the image is checked at step 1304, and the image is verified at step 1305. Finally, the advertisement is registered and indexed at step 1306.

Figure 14:
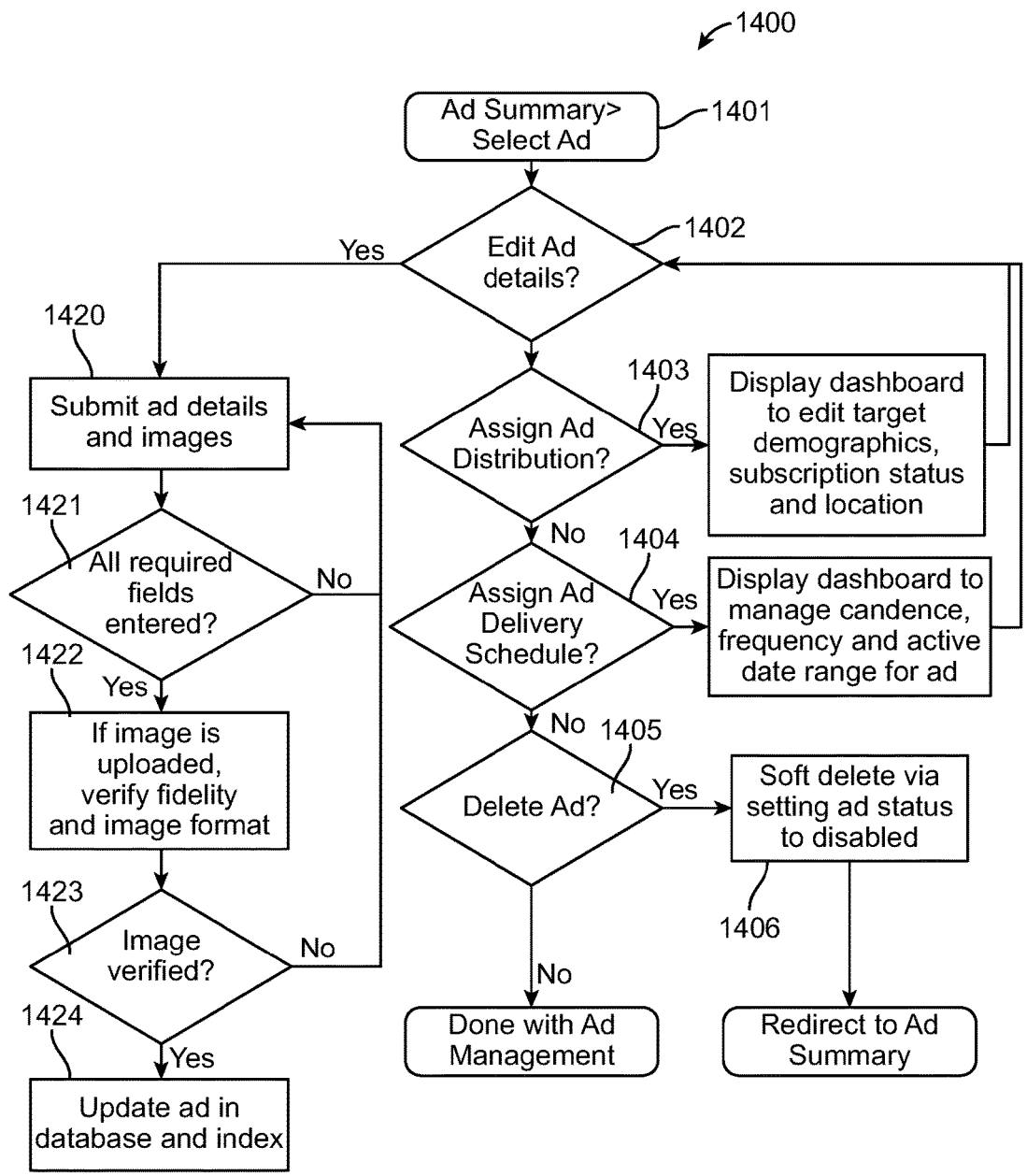
FIG. 14 is a flowchart of an exemplary system for a system administrator to manage details of the advertisements used with the present system.

FIG. 14 shows a further optional process 1400 for a system administrator to manage the advertisement. First, at step 1401, the system administrator selects the advertisement. At step 1402, the system administrator is given the option of editing the advertisement. At step 1403, the distribution demographics can be edited (i.e.: a determination can be made as to which users should receive the advertisement based upon their own personal preferences). At step 1404, the advertisement delivery schedule can be set. At step 1405, advertisements that have no distribution list or delivery schedule can be deleted. At step 1406, the advertisement is deleted. Alternatively, should editing of the advertisement be desired, advertisements that are entered into the system (complete with distribution and delivery parameters) can be added to the system's database at step 1420, fields checked at step 1421, and image verification performed at steps 1422 and 1423, followed by adding the updated advertisement to a database at step 1424.

Figure 15:
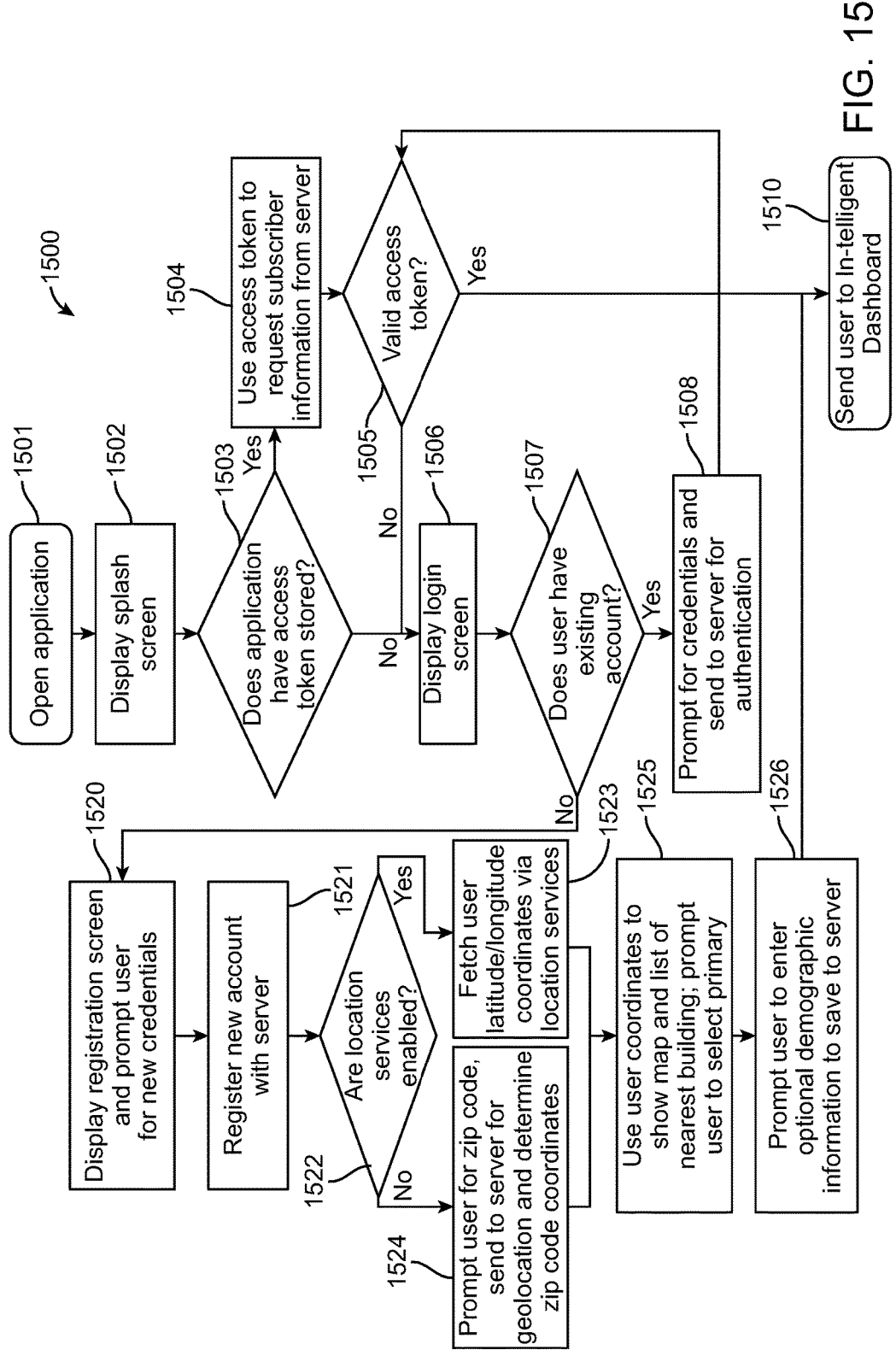
FIG. 15 is a flowchart of an exemplary system for a user to first register or to login to the present system's downloaded software app (prior to joining a community).

FIG. 15 illustrates an exemplary process 1500 where a user first registers or logs into the smartphone app running the present system. First, the user opens the app at 1501 and receives a display screen at 1502. If the app already has an access token stored therein at 1503, then one of two options are possible. First, the access token can be used to request subscriber information from the server at 1504. If the access token is determined by the server to be valid at 1505, then the user can be sent directly to the app dashboard at 1510. Alternatively, if no access token is present or if the token is invalid, then the user can be sent a display screen to login. Subsequently, the login can be verified to determine if the user has logged in before. If the user has logged in before, (yet still does not possess a valid authorization token), the user will be prompted at step 1508 to get new authorization credentials. If the user has not logged in before (i.e.: (s)he is a new user), then the system instead proceeds to step 1520 where the user is displayed a registration screen. The new user can then register a new account at 1521 and determine whether to enable their smartphone's location services in conjunction with the app at 1522. If the user chooses to enable location services, then the user's position can be fetched at 1523. Alternatively, if the user does not enable location services, then the user's position can be manually entered at step 1524. Next, at step 1524, a list of nearby building communities can be presented to the user such that the user can determine which building community (or communities) they wish to join. Optionally, at step 1526, the user can be prompted to enter optional demographic information.

Figure 16:
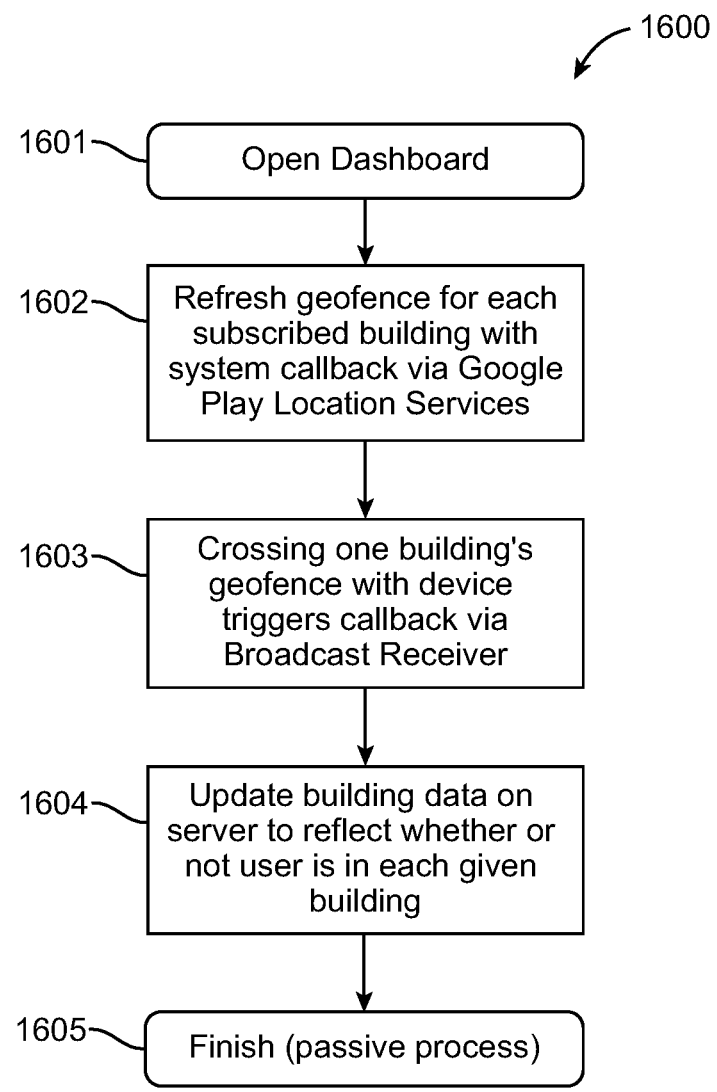
FIG. 16 is a flowchart of an exemplary method of geofencing for Android operating system smartphones.

FIG. 16 illustrates a preferred method 1600 for geofencing smartphones operating on an Android operating system. First, the system administrator opens their dashboard at 1601. At step 1602, the geofencing system refreshes and at 1603, the system will detect the user by geofencing. Next, at step 1604, the user's membership in the building community will be updated (with the user being added to the community if they are physically present, or removed from the building community if they are not physically present).

Figure 17:
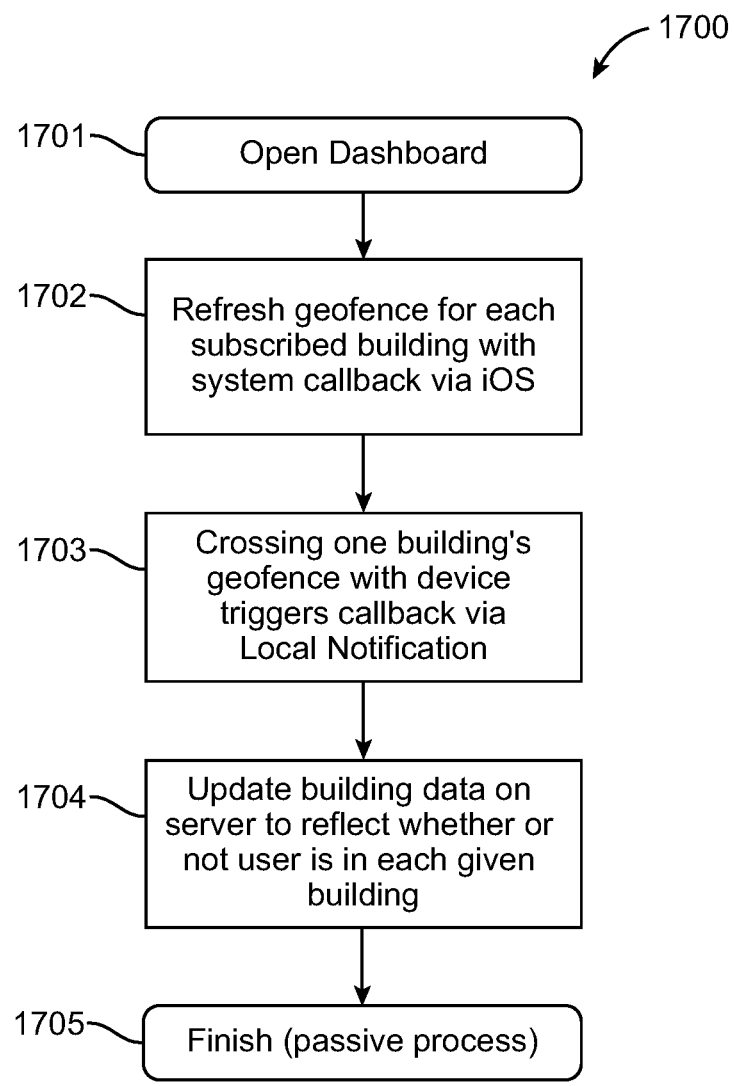
FIG. 17 is a flowchart of an exemplary method of geofencing for Apple iOS operating system smartphones.

Similarly, FIG. 17 illustrates a preferred method 1700 for geofencing smartphones operating on an Apple iOS operating system. First, the system administrator opens their dashboard at 1701. At step 1702, the geofencing system refreshes and at 1703, the system will detect the user by geofencing. Next, at step 1704, the user's membership in the building community will be updated (with the user being added to the community if they are physically present, or removed from the building community if they are not physically present).

Figure 18:
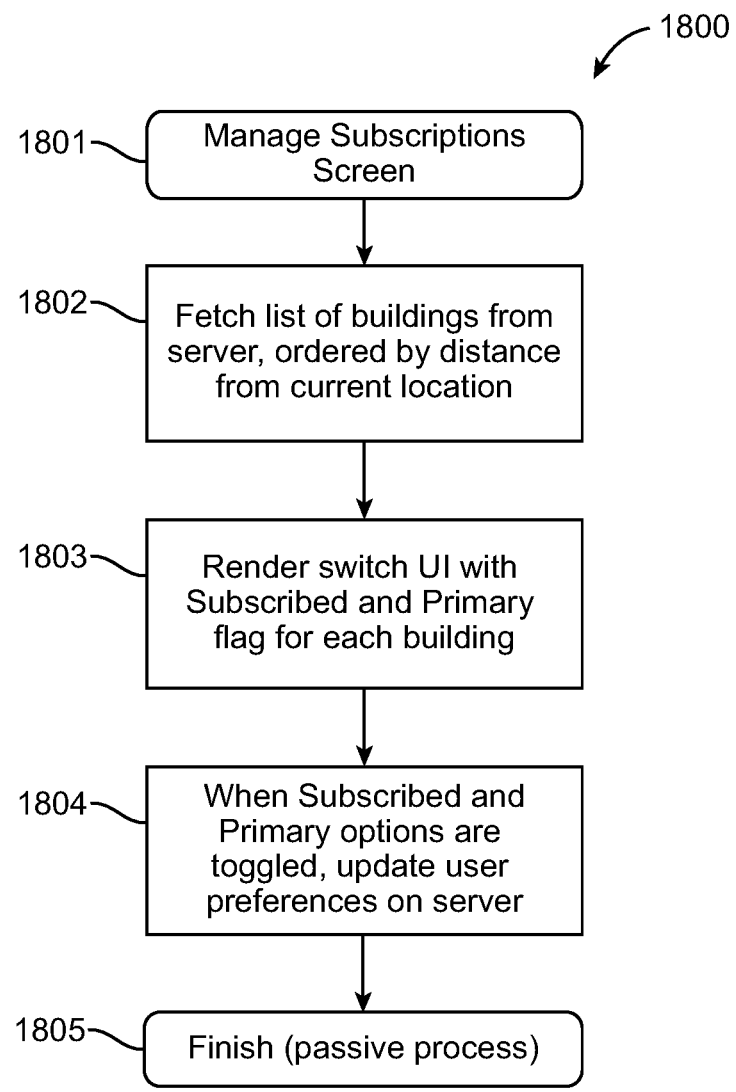
FIG. 18 is a flowchart of an exemplary process for a system administrator to manage building subscriptions.

FIG. 18 illustrates a preferred process 1800 for a system administrator to manage building subscriptions. At step 1801, the system administrator is displayed a subscription management screen. Next, at step 1802, the system retrieves a list of buildings that are in close proximity to the user. The user then uses the downloaded software app on their smartphone to select which building communities to join at step 1803. The system server is then updated with the user's subscriptions, finishing at step 1805.

Figure 19:
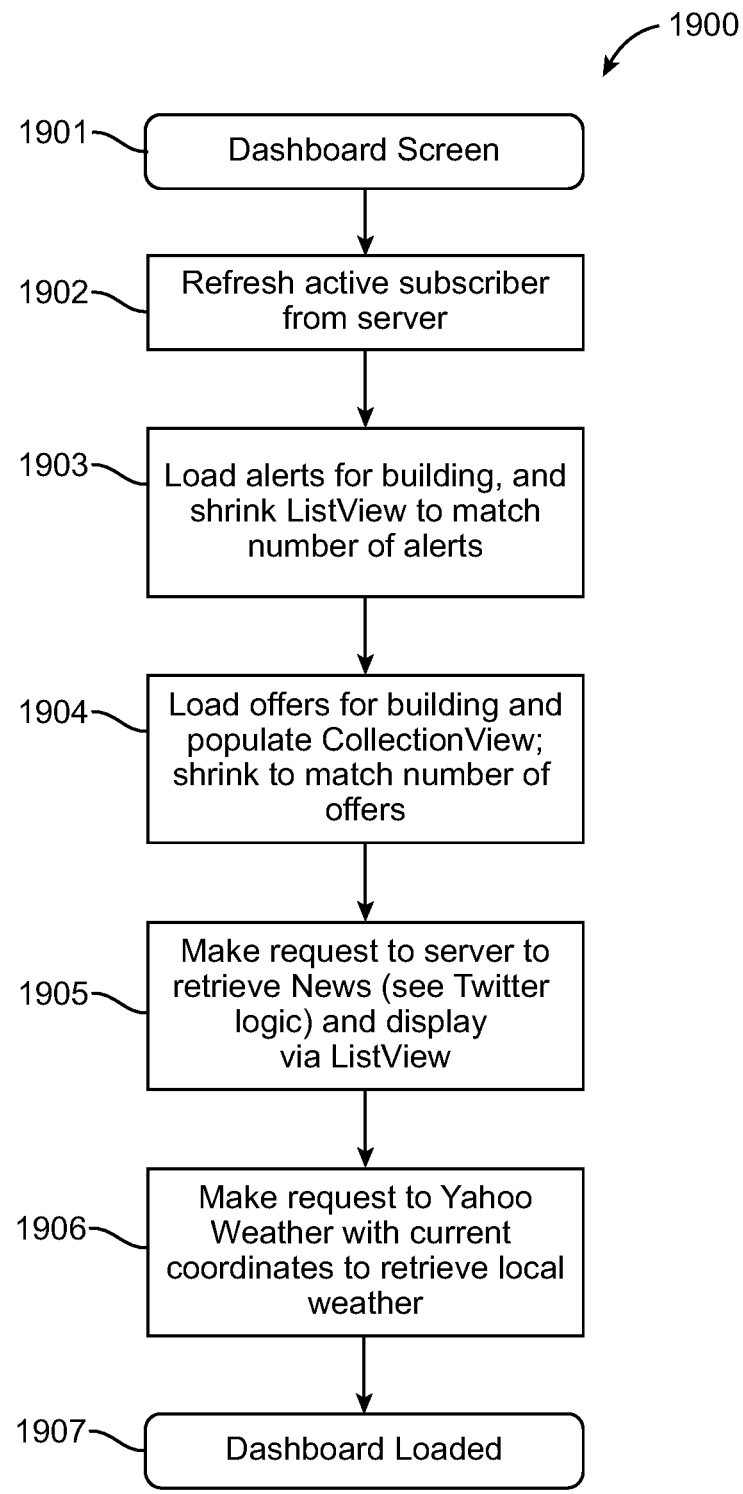
FIG. 19 is a flowchart of an exemplary process for operating the dashboard display of the user's smartphone while the user runs the present downloaded software app.

FIG. 19 illustrates an exemplary process 1900 for displaying a dashboard on the smartphone screen of a member of the property community. At step 1901, the app dashboard is displayed to the user. The app refreshes the screen at step 1902, building alerts are loaded at step 1903, and property-specific and non-property-specific messages are loaded at step 1904. At step 1905 the community member/user may make requests through the app to retrieve non-property-specific communication such as news and weather at 1906. The fully loaded dashboard is then displayed to the user at step 1907.

Figure 20:
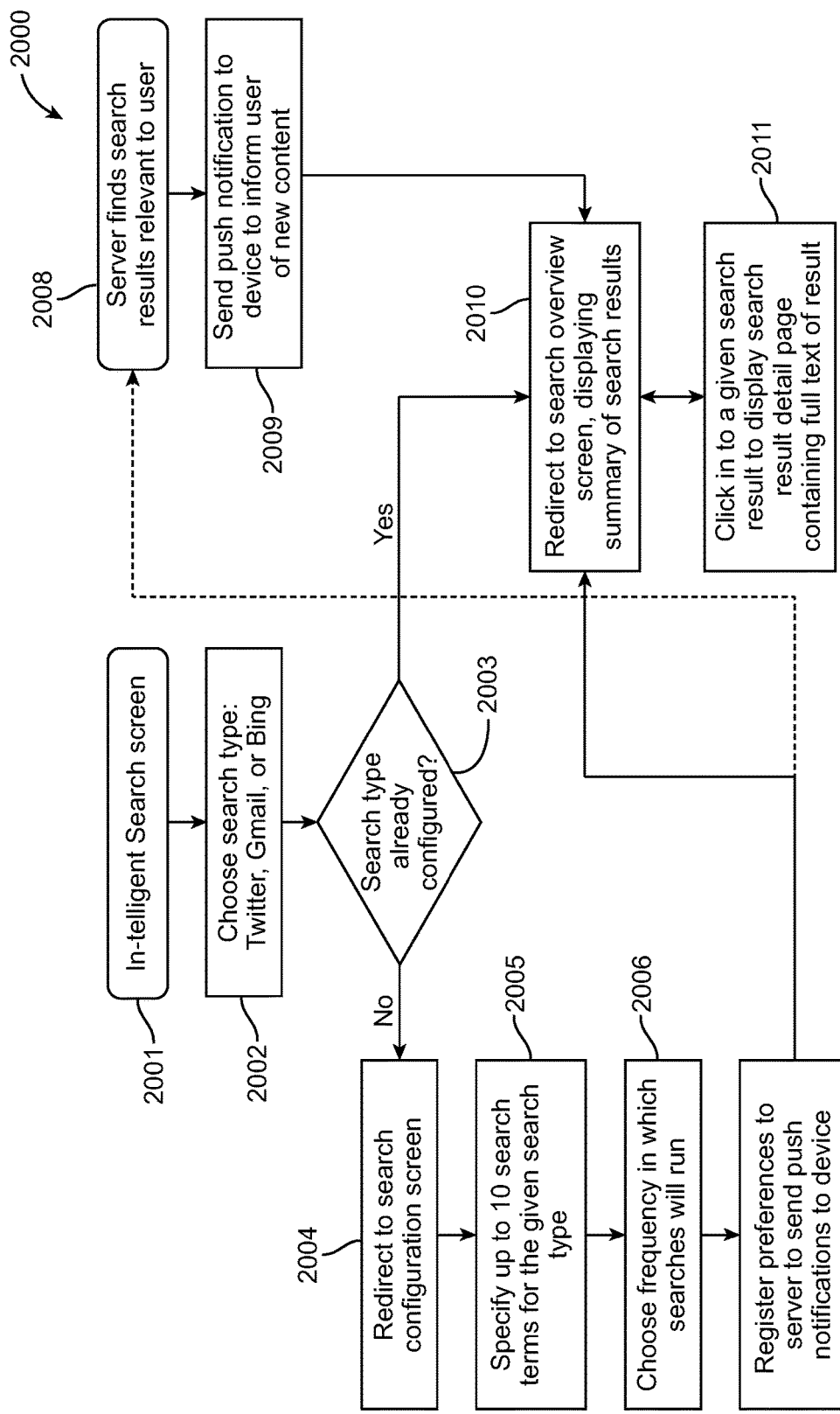
FIG. 20 is a flowchart of an optional process for adding search capabilities to the downloaded app of the present system.

FIG. 20 illustrates the optional process 2000 for a user to add search capabilities to the display of the app on the user's smartphone. First, the user is presented with a search screen at step 2001. Next, at step 2002 the user can select a type of search (for example a Twitter, Gmail or Bing search). At step 2003, the system then determines if this form of search has already been configured. Should a pre-configured search not exist, the system proceeds to step 2004 where a configuration screen is displayed. At step 2005, the user is then given the option of specifying desired search terms, and deciding on their search frequency at step 2006. At step 2007, these newly created search parameters are registered on the system's server. When the system's server finds search results that are relevant to the user at 2008, push notifications can be sent to the user at step 2009. At step 2010 the search results are displayed on the user's smartphone screen. Finally, at step 2011, the user can click on any one of the relevant search results and be displayed a screen page showing the full text of the particular search result selected.

Figure 21:
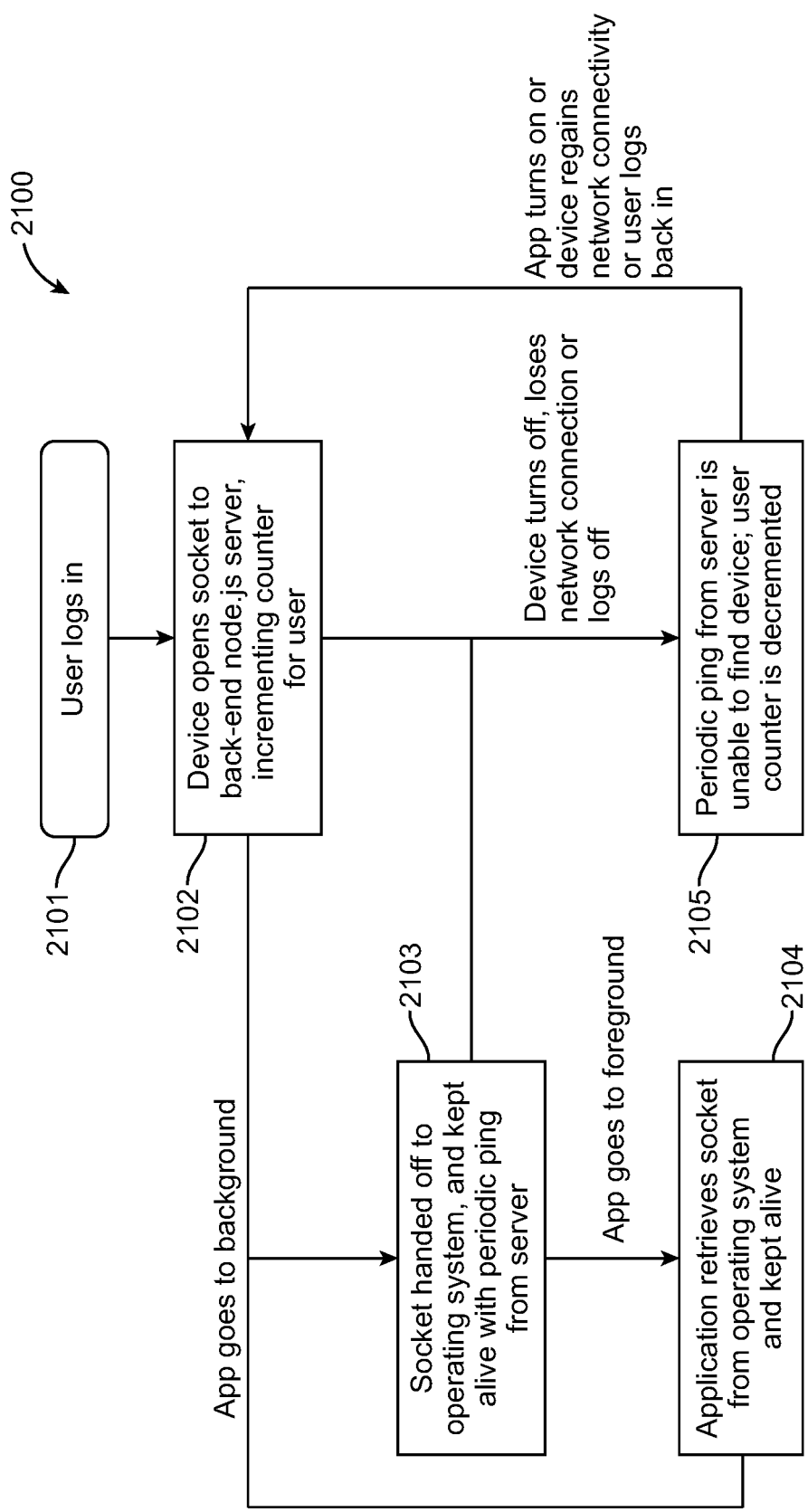
FIG. 21 is a flowchart of an exemplary system for detecting the presence of a user in a network.

FIG. 21 illustrates a process 2100 of detecting a user in a network. First, at 2101, the user logs into the system. Next, the app opens at 2102. Next, the app operates in the background at 2103, and is kept operating by periodic pining from the system, and can return to foreground operation at 2104. If the periodic ping does not find the user's smartphone, (e.g.: the smartphone has been turned off or loses network connectivity), then the app is turned off at 2105.

Figure 22:
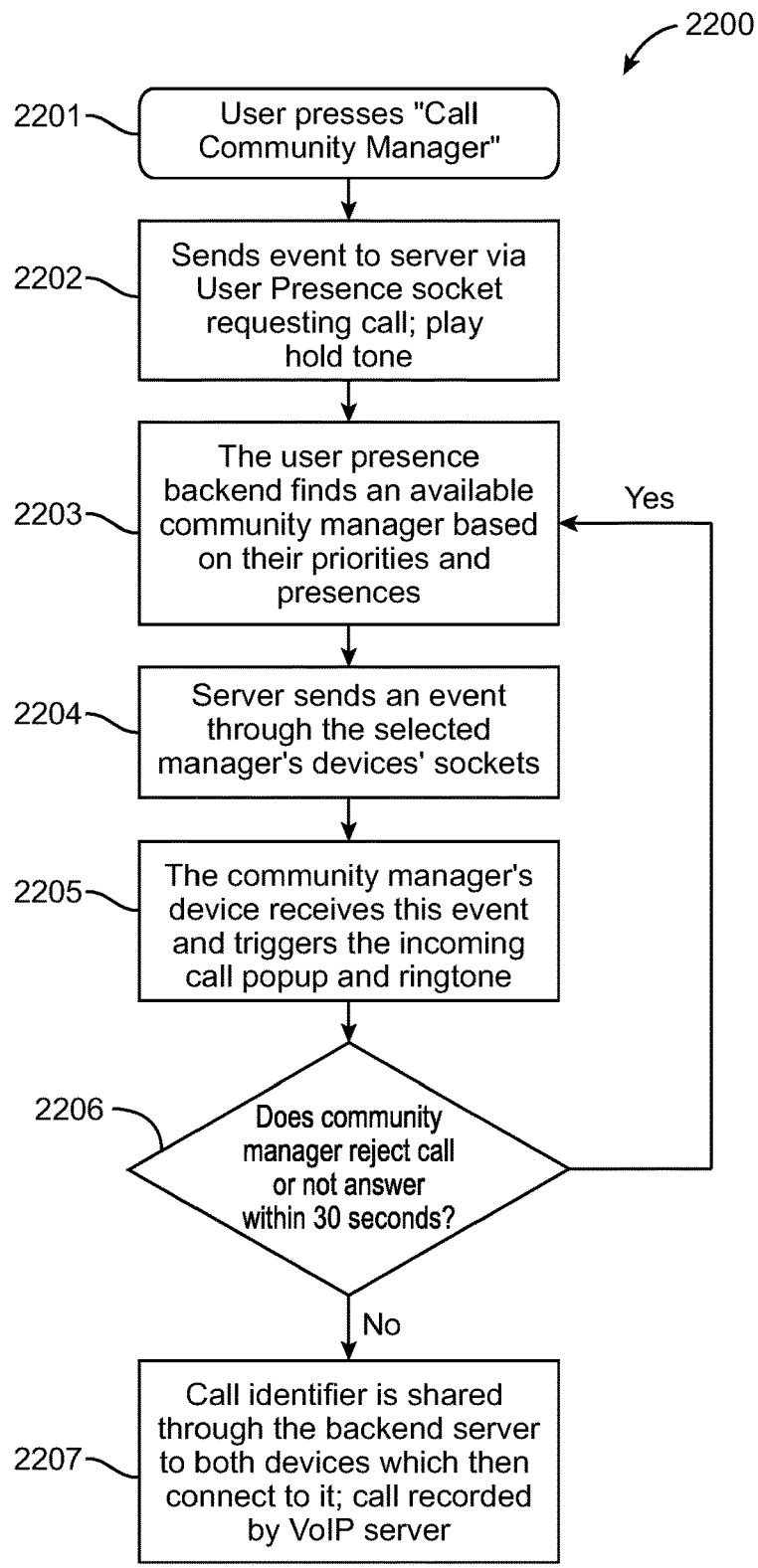
FIG. 22 is a flowchart of an exemplary system for a community member to make voice calls over the Internet to a building manager.

FIG. 22 illustrates an optional feature of the present system in which one of the user's/community members is able to call building management 12. In process 2200 the user first selects the "Call Community Manager" icon 2201. Next, at step 2202 the app sends a request to call to the building management 12, and plays a hold tone for the user. At step 2203, an available building manager is found and a signal is sent to the building manager at step 2204. At step 2205 the selected building manager's phone will ring. The community manager has a period of time (e.g.: 30 seconds) at step 2206 to answer their phone. If the selected building manager does not answer their phone within this period of time, the system will revert to step 2203 and another building manager will be selected. If no other building managers can be found, the call to the building manager is completed at step 2207. In addition, the call may be recorded as well at step 2207.

Figure 23:
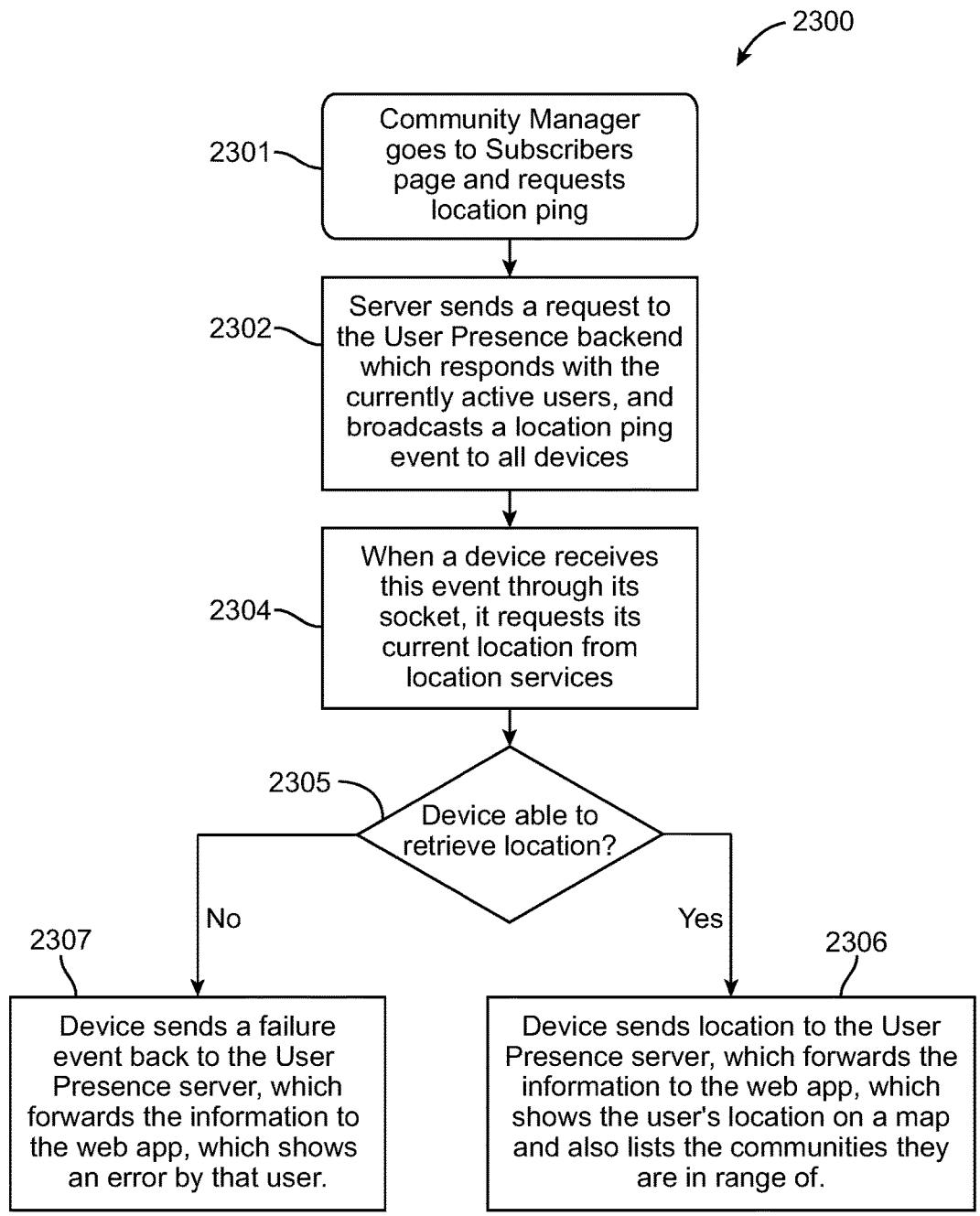
FIG. 23 is a flowchart of an exemplary system for detecting the location of a community member.

FIG. 23 illustrates an exemplary process 2300 for detecting the location of a community member. At 2301, the community manager (e.g.: building management) requests a location ping. At 2302, the system sends a request to the user's smartphone. When the ping has been received, the system requests the current location of the user's smartphone at 2304. At 2305, it is determined whether the user's smartphone has answered. If the user's smartphone has responded, the location is sent back to the system at 2306. Alternatively, if the user's smartphone has not responded, a failure event is sent back to the system at 2307.

Figure 24:
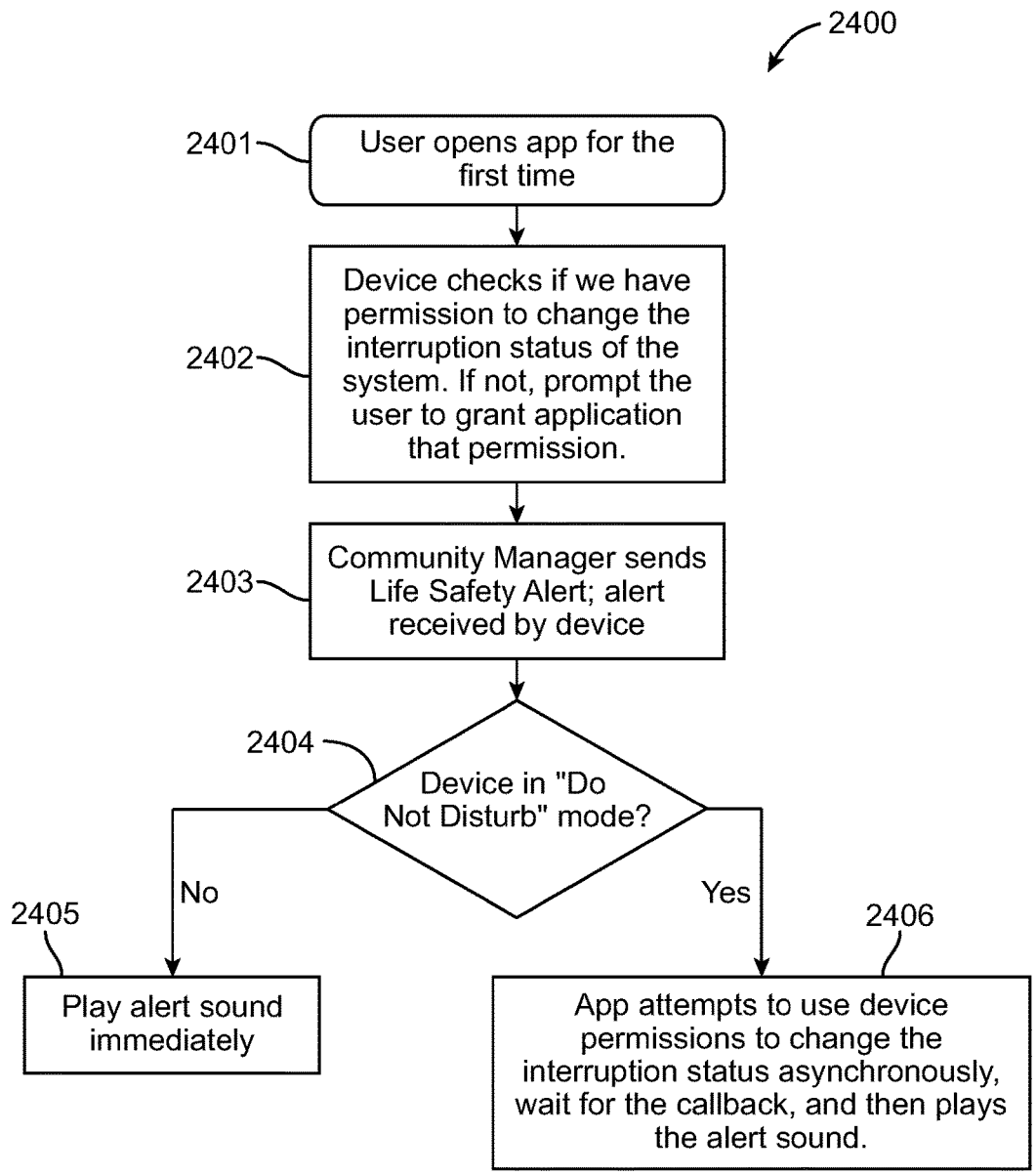
FIG. 24 is a flowchart of an exemplary process for overriding alert-interrupting states such as "silent" or "do not disturb" settings for an Android operating system smartphone.

FIG. 24 illustrates an optional process 2400 of the present system overriding the "silent" or "do not disturb" settings on a user's smartphone. At step 2401, the user opens the app for the first time. At step 2402 the app checks the user's smartphone interrupt status and determines whether the interrupt status is set to "silent" or "do not disturb". If it is, the app can automatically request the user's permission to change the interrupt status when receiving safety messages. Next, when a safety alert has been sent, the app will determine at step 2404 whether the "do not disturb" is activated or not. If it is not active, the app will play the alert sound at step 2405. Alternatively, if the "do not disturb" is activated, the app will override the "do not disturb" and play the alert sound at step 2406.

Figure 25:
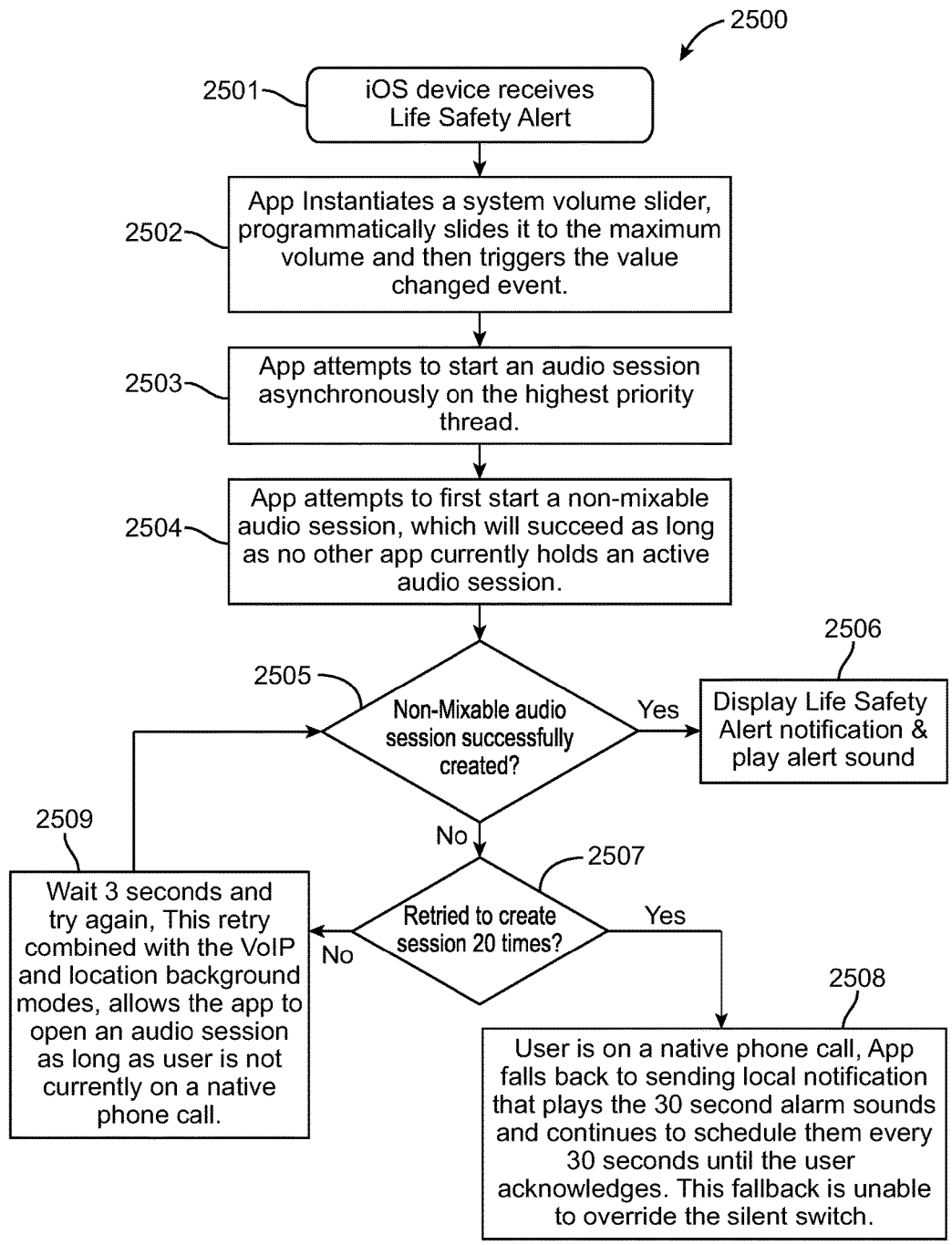
FIG. 25 is a flowchart of an exemplary process for overriding alert-interrupting states such as "silent" or "do not disturb" settings for an Apple iOS operating system smartphone.

Lastly, FIG. 25 shows a comparable override feature for a smartphone with an Apple iOS operating system. Process 2500 involves the smartphone receiving a safety alert at 2501. At 2502, the present system sets the smartphone speaker to maximum volume at 2502. At step 2503, the system to start an audio session asynchronously on the phone's highest priority thread. At 2504, the system attempts to start a non-mixable audio session and a determination is made whether the session has been correctly created at 2505. If the session has been correctly created, the life safety alert is both displayed and an alarm sounds at step 2506. Alternatively, the decision is repeated at timed intervals 2507 and resent at 2509. If the user is on a phone call the app falls back to only sending the visual notification at 2508. The advantage of step 2508 is that if the situation is an actual emergency, the user's phone call is not interrupted (which is preferable since the user may be speaking with emergency personnel on their phone at the same time).

What is claimed is:

1. A system to communicate with members of a community, comprising:

a non-transitory computer-readable medium having instructions stored therein that when executed by a computing device provide:
(a) a geofencing system operating in a geographic region for:
(i) determining the location of a plurality of first individuals based upon the location of their smart devices, and
(ii) adding, without user interaction, the individuals that are determined to be physically present in the geographic region to a community;
(b) a subscription system operating on the smart devices for adding second individuals that are not determined to be physically present in the geographic region to the community based on requests of the second individuals;
(c) a safety alert system operating on the smart devices for transmitting emergency safety alert messages to the members of the community, by:
(i) communicating with the smart devices to determine their alert-receiving state, and then automatically overriding any alert inhibiting state to ensure that the smart device is alert-enabled to receive the emergency safety alert messages, and
(ii) transmitting an emergency safety alert message to the smart device; and
(d) a geographic region-specific communication system operating on the smart devices for and sending geographic region-specific non-emergency non-safety alert messages from property management to the members of the community, wherein the smart device's alert inhibiting state is set by the user to disable alert function and to block the geographic region-specific non-emergency non-safety alert messages such that the emergency safety alert message is delivered to the smart device and the non-emergency non-safety alert messages are not delivered to the smart device.

2. The system of claim 1, wherein the geographic region is a building or property and the safety alerts are sent from building or property management.

3. The system of claim 1, further comprising:
(e) a non-geographic region specific communication system operating on the smart devices for sending non-geographic region-specific messages to the members of the community.

4. The system of claim 1, wherein the geofencing system comprises a Bluetooth low energy proximity sensing device that sends signals to the smart devices that are physically present in the geographic region.

5. The system of claim 4, wherein the Bluetooth low energy proximity sensing device is an I-Beacon.

6. The system of claim 1, wherein the safety alert system and the geographic region-specific communication system both operate through a downloadable app on each of the smart devices.

7. The system of claim 1, wherein the geographic region-specific messages comprise advertisements from businesses associated with the property.

8. The system of claim 1, wherein the geofencing system determines the location of the smart devices within the geographic region.

9. The system of claim 1, wherein the geofencing system adds individuals to the community when the individuals are not physically present in the geographic region but are physically present near the geographic region.

10. The system of claim 1, wherein the subscription system adds individuals to a plurality of different communities.

11. The system of claim 1, wherein the safety alert is an audible alarm.

12. The system of claim 1, wherein the safety alert is a visual alarm.

13. The system of claim 1, wherein the safety alert system and the geographic region specific communication system operate over wi-fi on the property.

14. The system of claim 1, wherein the safety alert system and the geographic region specific communication system operate over in-building cellular antennae.

15. A system for communicating with members of a community, comprising:
   a non-transitory computer-readable medium having instructions stored therein that when executed by a computing device cause the system to perform operations comprising:
   (a) using a geofencing system to determine which first individuals are physically present in a geographic region based upon the location of their smart devices;
   (b) adding the first individuals that have been determined to be physically present in the geographic region by the geofencing system to a community;
   (c) permitting second individuals that are not physically present on the geographic region to subscribe to join the community based on requests of the second individuals;
   (d) determining the alert-receiving state of each of the individuals' smart devices, and then: automatically overriding any alert-inhibiting state of the smart devices to ensure that the smart devices are alert-enabled to receive emergency safety alert messages, and then
   (e) transmitting an emergency safety alert message to each of the smart devices; and
   (f) transmitting geographic region-specific non-emergency non-safety alert messages to the smart devices, wherein each user's smart device's alert inhibiting state is set to disable alert function and to block the geographic region-specific non-emergency non-safety alert messages such that the emergency safety alert message is delivered to the smart device and the non-emergency non-safety alert messages are not delivered to the smart device.

16. The method of claim 15, wherein the geographic region is a building or property and the safety alerts are sent from building or property management.

17. The method of claim 15, wherein using a geofencing system comprises sending signals from Bluetooth low energy proximity sensing devices in the geographic region to determine which smart devices are physically present in the geographic region.

18. The method of claim 15, wherein the individuals download a software app on their smart devices and the safety alert and geographic region-specific messages are sent through the downloaded software app on the smart devices.

19. The method of claim 15, wherein the safety alert comprises an audible or visual alarm.

20. The method of claim 15, wherein overriding any alert-inhibiting state comprises requesting to override any alert-inhibiting state and then overriding the alert-inhibiting state with the user's permission to ensure that the smart device is alert-enabled.

21. The method of claim 15, wherein overriding any alert-inhibiting state comprises automatically overriding any alert inhibiting state to ensure that the smart device is alert-enabled.

* * * * *